(12) United States Patent
Garlepp et al.

(10) Patent No.: US 6,687,780 B1
(45) Date of Patent: Feb. 3, 2004

(54) EXPANDABLE SLAVE DEVICE SYSTEM

(75) Inventors: Bruno W. Garlepp, Austin, TX (US); Richard M. Barth, Ashland, OR (US); Kevin S. Donnelly, Los Altos, CA (US); Ely K. Tsern, Los Altos, CA (US); Craig E. Hampel, San Jose, CA (US); Jeffrey D. Mitchell, Santa Clara, CA (US); James A. Gasbarro, Fox Chapel, PA (US); Billy W. Garrett, Jr., Mountain View, CA (US); Fredrick A. Ware, Los Altos Hills, CA (US); Donald V. Perino, North Potomac, MD (US)

(73) Assignee: Rambus Inc., Los Altos, CA (US)

( * ) Notice: Subject to any disclaimer, the term of this patent is extended or adjusted under 35 U.S.C. 154(b) by 495 days.

(21) Appl. No.: 09/706,238

(22) Filed: Nov. 2, 2000

(51) Int. Cl.⁷ .......................... G06F 13/40; H03K 17/16
(52) U.S. Cl. ......................................... 710/305; 326/30
(58) Field of Search ................................. 710/305, 100, 710/300–304; 326/21–34

(56) References Cited

U.S. PATENT DOCUMENTS

| | | | | | |
|---|---|---|---|---|---|
| 4,744,076 A | * | 5/1988 | Elias | ........................... | 326/101 |
| 5,001,707 A | * | 3/1991 | Kositpaiboon et al. | ..... | 370/440 |
| 5,467,455 A | * | 11/1995 | Gay et al. | ................... | 710/100 |
| 5,523,703 A | | 6/1996 | Yamamoto et al. | | |
| 5,604,450 A | * | 2/1997 | Borkar et al. | ................. | 326/82 |
| 5,731,711 A | * | 3/1998 | Gabara | ......................... | 326/30 |
| 5,781,028 A | * | 7/1998 | Decuir | ........................ | 326/30 |
| 6,269,081 B1 | * | 7/2001 | Chow et al. | ................ | 370/241 |
| 6,300,789 B1 | * | 10/2001 | Ball | ............................. | 326/30 |
| 6,486,696 B1 | * | 11/2002 | Cao | ............................. | 326/30 |
| 6,519,664 B1 | * | 2/2003 | Rodriguez et al. | .......... | 710/100 |

OTHER PUBLICATIONS

Rambus, Inc., "Rambus Technology Overview", Feb. 1999, pp. 1–62.

* cited by examiner

*Primary Examiner*—Sumati Lefkowitz
(74) *Attorney, Agent, or Firm*—Gary S. Williams; Pennie & Edmonds LLP

(57) ABSTRACT

A bus system for use with addressable memory has a global bus of uni-directional signal lines. The global bus has a first end and a second end. A master device transmits data to and receives data from the global bus. First and second global bus terminators are coupled to the first and second ends of the global bus, respectively. One or more subsystems are connected in parallel to each other and to the master device via the global bus. Each subsystem includes a local bus, one or more slave devices coupled to the local bus, a write buffer that receives incoming signals from the master device via the global bus and transmits the incoming signals to the one or more slave devices via the local bus, and a read buffer that receives outgoing signals from the one or more slave devices via the local bus and transmits the outgoing signals to the master device via the global bus.

37 Claims, 20 Drawing Sheets

Active Terminator

Active Terminator

Active Terminator

Active Terminator

Memory Subsystem

Memory Subsystem

EXPANDABLE SLAVE DEVICE SYSTEM

The present invention relates to an expandable slave device system in a computer system, and in particular to an expandable slave device system using a global bus and multiple subsystem buses.

BACKGROUND OF THE INVENTION

The size of computer application programs is ever-increasing; therefore, the amount of memory needed to handle the application programs is also increasing. To reduce the execution time of the application programs, larger amounts of memory, such as semi-conductor random access memory (RAM) are added to computer systems.

In FIG. 1, a bus system is a chip-to-chip electronic communications system that connects one or more slave devices 42 to a master device 44 through shared communication lines 46, called a bus. Typically, the slave devices 42 are memory devices. In a typical memory system 50, the bus 46 interconnects a memory control master device (M) 44 and memory devices (D) 42. The bus 46 is a bi-directional data bus having many signal lines 54-1 to 54-m. In a bidirectional data bus, the memory control master device 44 transmits information on the signal lines 54 to the memory devices 42, and the memory devices transmit information back to the memory control master device 44 on the signal lines 54. The data bus 46 has a loaded bus impedance of $Z_L$. For reliable operation at the loaded bus impedance $Z_L$ at a given frequency, the memory system 50 has a maximum predetermined number (from one to N) of memory devices 42 connected to the data bus 52. The bi-directional data bus 46 has many bus signal lines 54. One end of each bus signal line 54 terminates at an I/O pin 56-M on the master device 44; the other end of each bus signal line terminates at a resistive terminator (T) 60. The impedance or resistance of the resistive terminator 60 matches the loaded bus impedance $Z_L$ to minimize reflections by absorbing signals transmitted on the bus signal line 54. The opposite end of each terminator 60 connects to a termination voltage $V_T$ which provides an AC ground and sets the DC termination voltage of the bus signal line 54. Because the voltage of the bus signal lines 54 is pulled-up to the value of the termination voltage $V_T$, the termination voltage $V_T$ represents a state of a logical data signal, such as a logical zero, for digital signals transmitted on the bus signal lines 58. Another state of the logical data signal, such as a logical one, is represented by a voltage that is proportional to an amount of current that flows through the resistive terminator 60.

Each signal line connects to a write buffer 62 and a read buffer 63 in the master device 44. The read buffer 63 receives data signals from its respective signal line. The write buffer 62 has a drive circuit that drives data signals onto its respective signal line of the bus 46.

When driving a logical one, the drive circuit of the write buffer 62 causes current to flow through the resistive terminator 60. Switched current sources, such as open drain NMOS devices, can be used as drive circuits in either the master device 44 and the memory devices 42. The drive circuit generates a logical zero state by not providing a path for current to flow through the resistive terminator T 60 to ground. The drive circuit generates a logical one state by providing a path for current to flow through the resistive terminator 60 to ground. In a binary system, a logical zero is represented by the termination voltage $V_T$, which will also be referred to as $V_{Hi}$; and, a logical one is represented by a low voltage $V_{Lo}$ in accordance with relationship one as follows:

$$V_{Lo}=(V_T-IoZ_L). \tag{1}$$

The current Io is the nominal amount of current sunk by an active drive circuit when driving a logical one.

This signaling scheme has two benefits. First, the drive circuit does not consume power when driving one of the logical states—the logical zero state $V_{Hi}$. Second, the drive circuit provides a high output impedance to the bus signal lines 54, which minimizes the amount of energy lost as the signals propagate, past the memory devices 42, towards the resistive terminator 60 at the ends of the data bus 46. At the master device 44, the input impedance is equal to the full loaded impedance $Z_L$ of the bus signal line 54. When transmitting signals, the master device 44 generates full-swing signals having a voltage difference $V_{Swing}$ equal to the difference between the voltages representing the logical zero and logical one states in accordance with relationship two as follows:

$$V_{swing}=(V_{Hi}-V_{Lo}). \tag{2}$$

The signals transmitted by the master device 44 propagate down the bus signal line 54, past the memory devices 42, and terminate at the resistive terminator 60. The conductor between the bus signal line 54 and an I/O pin 56 of the memory device 42 is referred to as a stub. As long as the I/O pins 56-D of the memory devices 42 form short stubs and present a high input impedance, the signals lose little energy and produce minimal parasitic reflections as the signals travel down the bus signal line. Stubs are considered to be short if their electrical lengths are shorter than the rise and/or fall times of the signals. The electrical length refers to the amount of time for a signal to propagate from one end of the stub to the other. The physical length of the stub is directly proportional to the electrical length of the stub.

When a memory device 42 transmits to the master device 44, although connected to a single bus signal line 54, each drive circuit in the memory device 42 effectively "sees" two lines—one line towards the master 44 and one line towards the resistive terminator 60. Each line has a net impedance equal to one-half of the full loaded impedance $Z_L$ of the bus signal lines 54 ($\frac{1}{2}Z_L$). Assuming that the drive circuits in the memory devices 42 also sink an amount of current equal to Io, the signals that emerge from the memory device I/O pins 56-D split at the bus signal line 54 with half the signal voltage traveling toward the master 102 and half toward the resistive terminators 60. The half-swing signals that travel toward the resistive terminators 60 pass by the other memory devices 42 and are absorbed by the resistive terminators 60. The half-swing signals that travel toward the master device 44 pass by other memory devices 42 and encounter an open circuit at the end of the bus signal line 54 at the master device I/O pin 56-M. The open circuit causes the signals from the memory device 42 to reflect back down the bus signal lines 54 towards the resistive terminator 60 which doubles the voltage at the I/O pin of the master device 56-M. Although only half of the voltage (i.e. $\frac{1}{2}V_{Swing}$) was transmitted towards the master device 44, the master device 44 still receives a full swing signal $V_{Swing}$ at its I/O pins 56-M because of the reflection, provided that the bus signal lines 54 terminate in a high impedance (i.e., an open circuit) at the master device 44. The other memory devices 42 in the memory system 50 will see half-amplitude signals pass their I/O pins 56-D at each of two different times. As a result, these half-amplitude signals cannot be reliably detected by the other memory devices 42. Since a memory device 42 transmits data to the master device 44 and not to another memory device 42, this result is acceptable. Regardless of which memory device 42 in the memory system 50 is transmitting, a full swing signal $V_{Swing}$ appears at the input of the intended receiving device.

FIG. 2 shows a diagram of the structure and electrical properties of an exemplary bus signal line 54 of the prior art memory system 50 of FIG. 1. The portion of the bus signal line 54 that connects to the memory devices 42 forms a repetitive structure of signal line segments 64 and memory devices 42 as shown. Each signal line segment 64 can be modeled as a transmission line of length d having an inductance per unit length of Lo, a capacitance per unit length of Co, a dielectric conductance per unit length of Gp, and a conductor resistance per unit length of Rs. The lossy, complex characteristic impedance of such a transmission line is in accordance with relationship three as follows:

$$Z_{OL} = \sqrt{\frac{Rs + j\omega Lo}{G_p + j\omega Co}}. \quad (3)$$

Assuming that the conductor resistance per unit length, Rs, and the dielectric conductance per unit length, Gp, are small, the characteristic impedance Zo of the bus signal line segment is approximated by relationship four as follows:

$$Zo = \sqrt{\frac{Lo}{Co}}. \quad (4)$$

FIG. 2 also shows the dominant electrical properties at the memory device I/O pins 56-D at nominal operating frequencies. For the memory devices 42, the effective input inductance is $L_I$, the effective input capacitance is $C_I$, and the effective input resistance is $R_I$. The input resistance $R_I$ incorporates all input losses including metallic, ohmic, and on-chip substrate losses. The input resistance $R_I$ is also directly proportional to the frequency. Assuming that the input capacitance $C_I$ dominates, the input electrical characteristics of the memory devices 42 is in accordance with relationships five and six as follows:

$$Xc = \frac{1}{2\pi f C_1} \gg X_L = 2\pi f L_1, \text{ and} \quad (5)$$

$$Xc = \frac{1}{2\pi f C_1} \gg R_1. \quad (6)$$

At the system operating frequency, the effective loaded impedance, $Z_L$, of the bus signal lines 54 is closely approximated in accordance with relationship seven as follows:

$$Z_L = \sqrt{\frac{L_o \cdot d}{(C_o \cdot d) + C_1}}. \quad (7)$$

The lumped capacitance $C_I$ at the memory devices I/O pins 56-D is distributed into the bus signal line segments 64 and into the effective impedance of the transmission lines to change the effective impedance of the structure from the higher unloaded value of Zo to a lower, loaded impedance of $Z_L$. This is possible as long as the electrical length d of the bus signal line segments 64 is less than the rise and/or fall times of the signals on the data bus 46. If the electrical length d of the segments 64 is too long, the bus signal line 54 will look like a series of transmission lines 64 having impedance Zo with capacitive loads of magnitude $C_I$ placed at intervals of length d, rather than appearing to distribute the lumped capacitance $C_I$ into the bus signal line 54. By choosing an appropriate inductance per unit length of Lo, capacitance per unit length of Co, and electrical length d for the segments 64, the bus signal line 54 can provide a continuous impedance at a desirable effective loaded impedance $Z_L$ despite the lumped parasitic input capacitances $C_I$ at the memory devices' I/O pins 56-D. Typically, practical considerations, such as manufacturing tolerances, limit the characteristic impedance Zo to less than seventy-five ohms.

A periodic-bus signal line structure having a loaded impedance $Z_L$ using segments 64 of impedance Zo and length d between the memory devices 42 produces a bus signal line 54 that has a total length equal to at least the product of the segment length d and the number of memory devices 42. If needed, the total length of the bus signal line 54 can be increased by attaching transmission lines having a characteristic impedance equal to the loaded impedance $Z_L$, (i.e., $ZO=Z_L$) to either one or both ends of the periodic signal line structure. However, the total length of the bus signal line 54, and therefore the number of memory devices 42, is limited by timing considerations. Therefore, a memory system that increases the number of memory devices attached to a memory system is needed.

The periodic structure is formed by connecting each memory device 42 to an adjacent memory device at a regular spacing, which is called the pitch. A typical pitch is equal to approximately ten millimeters (mm). The periodic structure has a bandwidth (passband), and a loaded bus impedance (Bloch impedance). Decreasing the pitch of the periodic structure increases the passband and reduces the Bloch impedance. However, the minimum amount of pitch is limited by the physical size of the memory device 42 and board layout requirements. Therefore, an apparatus and method that increases the passband and reduces the Bloch impedance while meeting the pitch requirements is needed.

The repetitive arrangement of the memory devices 42 at intervals of length d along the bus signal line 54 also causes the bus signal line 54 to act as a multi-pole low-pass filter. Because the impedance characteristics of the loaded, terminated bus signal lines 54 provide frequency-dependent propagation paths for signals transmitted between the master device 44 and the memory devices 42, the bus signal lines 54 may also be referred to as propagation channels.

In FIG. 3, the frequency response (H(f)) for bus signal lines having four, eight and sixteen memory devices at a given loaded impedance $Z_L$ and input capacitance $C_I$ is shown. The cut-off frequency of a bus signal line, and therefore the bandwidth, decreases as the number (N) of memory devices 42 increases. Referring also to FIG. 2, each memory device 42 acts like a lossy load that attenuates a signal. The lossy nature of the load from the memory device 42 decreases the passband as the number of memory devices increases because of the attenuation of the memory devices 42. An attenuation of 1.5% per memory device 42 is typical and results in a loss of signal amplitude of about 50% when thirty-two memory devices 42 are attached to a signal line. The attenuation places a practical limit on the number of memory devices 42 that can be attached to a bus signal line because decreasing the passband reduces system performance.

In FIG. 4, the frequency response (H(f)) for bus signal lines having memory devices spaced at three different distances at a given loaded impedance $Z_L$ and input capacitance $C_I$ is shown. The relationships between the distances (d1, d2 and d3) between adjacent memory devices are in accordance with relationship eight as follows:

$d1<d2<d3.$ (8)

The cut-off frequency of the bus signal line response (H(f)), and therefore the bandwidth, decreases as the distance between the memory devices 42 increases. Since the minimum distance between adjacent memory devices 42 is limited by practical space considerations and since the bandwidth decreases as the number of memory devices 42 increases, the memory system 50 is limited in both bandwidth and capacity. To maintain a desired loaded impedance and bandwidth while increasing the number of memory devices 42, the bus signal line structure is changed in two ways. First, the distance d (64 FIG. 2) between adjacent memory devices 42 is decreased to compensate for the reduction in bandwidth because the number of memory devices 42 attached to the bus signal line 54 has increased.

Second, the characteristic impedance, Zo, of the segments 64 (FIG. 2) is increased to maintain the desired loaded impedance $Z_L$ while distributing the memory device input capacitance $C_I$ across the shortened signal line segments 64 (FIG. 2). However, there is a practical limit to the distance d between adjacent memory devices; and the characteristic impedance of the memory device is typically limited to below seventy-five ohms. Consequently, the maximum allowable number (N) of memory devices 42 in the system 50, and therefore the system memory capacity, is limited. This capacity limitation is a problem for systems requiring a memory system with both high bandwidth and a large capacity. Therefore an expandable memory system that provides high bandwidth and a large capacity is needed.

Decreasing the pitch between the memory devices 42 decreases the loaded bus impedance of the signal lines 54. For a predefined voltage swing, as the pitch is reduced, more power is needed to drive the signal lines 54 of the bus with that voltage swing. A predefined voltage swing is necessary for proper receiver operation. A typical voltage swing is equal to approximately 800 millivolts (mV); and, a typical loaded bus impedance is equal to approximately thirty ohms. To drive a signal line 54 in one direction, the drive circuit of the master device 42 sinks approximately twenty-six milliamperes (mA) of current. To drive a signal line in two directions with a limitation of sinking twenty-six mA of current, a drive circuit of a memory device 42 will transmit a 400 mV signal, not an 800 mV signal, towards both the resistive terminator and the master device. A reflection restores the 400 mV signal to its full size. Because drive circuits are limited as to the amount of current they can sink, it is not desirable to increase the size of the transistors of the drive circuit.

Referring back to FIG. 2, transmission lines with loads spaced at a constant pitch can be analyzed as periodic structures. The signal line 54 is a type of transmission line and the loads are the memory devices 42. The signal line 54 operates in accordance with relationship nine as follows:

$$\cos(bd) = \cos(kod) - \left(\frac{Zo}{2Y}\right) \cdot \sin(kod), \quad (9)$$

The propagation constant for the loaded signal line is b. The unloaded propagation constant is ko. The pitch of the memory devices 42 is d. The unloaded impedance of the signal line is Zo. The admittance of each memory device 42 is Y. Relationship nine can be solved for bd, where b is the quotient of the radian frequency w of the wave on the signal line and the propagation velocity vp, i.e., b=w/vp.

The following information can be discerned from relationship nine, called a dispersion relation. First, for a given unloaded propagation constant b and given memory device load, decreasing the pitch reduces the passband, and therefore performance. Increasing the number of memory devices 42 while maintaining the same pitch does not affect the passband of the loaded signal line. Second, for a given unloaded propagation constant, a given memory device load and a given pitch, the passband is defined by the maximum value for b called b__max. For example, a signal line with an unloaded propagation constant ko equal to fifty-two, with a load of two picofarads (pf) and a pitch of seven mm on a thirty ohm signal line, the passband maximum velocity b__max is equal to approximately 100 radians/meter. At a frequency of 1.2 gigahertz (GHz), the loaded propagation velocity of the signal line 54 is approximately equal to 0.25 c, where c is equal to the speed of light. If the pitch is increased to fourteen mm, the passband maximum velocity b__max increases to equal approximately 200 radians/meter. Maintaining a constant propagation velocity, the passband frequency increases to about 2.4 GHz. Thus, doubling the pitch between memory devices 42 doubles the frequency of the passband. Assuming a constant propagation velocity, the passband frequency increases to allow for more throughput on the signal line 54. Third, there is tradeoff between the number of memory devices 42 attached to the signal line 54 and the total length of the signal line 54. Increasing the number of memory devices 42 while maintaining a constant length decreases the pitch, and therefore decreases the passband. The passband is directly proportional to the data rate. Therefore the capacity and data rate of a memory system are inversely related to each other. Furthermore, when increasing the capacity of the system, the lossy load of the memory devices 42 increases the attenuation on the signal line. The increased attenuation limits the number of memory devices 42 on the signal line 54 regardless of the pitch and further reduces the passband. Therefore, a memory system is needed that maintains or increases the data rate while increasing the capacity.

Another limitation of the prior art memory system 50 of FIG. 1 is the read-write bubble problem which decreases bus utilization efficiency. A read-write bubble is a an interval of time during which the master device must remain idle and cannot read or write data. The read-write bubble results when a write to a closer memory device on the bus immediately precedes a read from a more distant memory device on the bus. The more distant memory device waits to transmit its read data so that it will not interfere with the reception of the write data at the closer memory device. The read-write bubbles reduce the bus utilization efficiency from an ideal of 100%. In addition, read-write bubbles increase the latency when reading data because the more distant memory device waits before transmitting data. Therefore, a memory system that reduces the latency, or read/write bubbles, is needed.

SUMMARY OF THE INVENTION

A bus system for use with addressable slave devices has a global bus of uni-directional signal lines. The global bus has a first end and a second end. A master device transmits data to and receives data from the global bus. First and second global bus terminators are coupled to the first and second ends of the global bus, respectively. One or more subsystems are connected in parallel with each other and to the master device via the global bus. Each subsystem includes a local bus, one or more slave devices coupled to the local bus, a write buffer that receives incoming signals from the master device via the global bus and transmits the incoming signals to the one or more slave devices via the local bus, and a read buffer that receives outgoing signals from the one or more slave devices via the local bus and transmits the outgoing signals to the master device via the global bus.

In one embodiment, the slave devices include memories. In another embodiment, the subsystem includes first and second subsystem terminators that are coupled to the local bus. In yet another alternate embodiment, at least one of the first and second subsystem terminators is an active terminator.

BRIEF DESCRIPTION OF THE DRAWINGS

Additional objects and features of the invention will be more readily apparent from the following detailed description and appended claims when taken in conjunction with the drawings, in which:

DETAILED DESCRIPTION OF THE PREFERRED EMBODIMENTS

Figure 1:
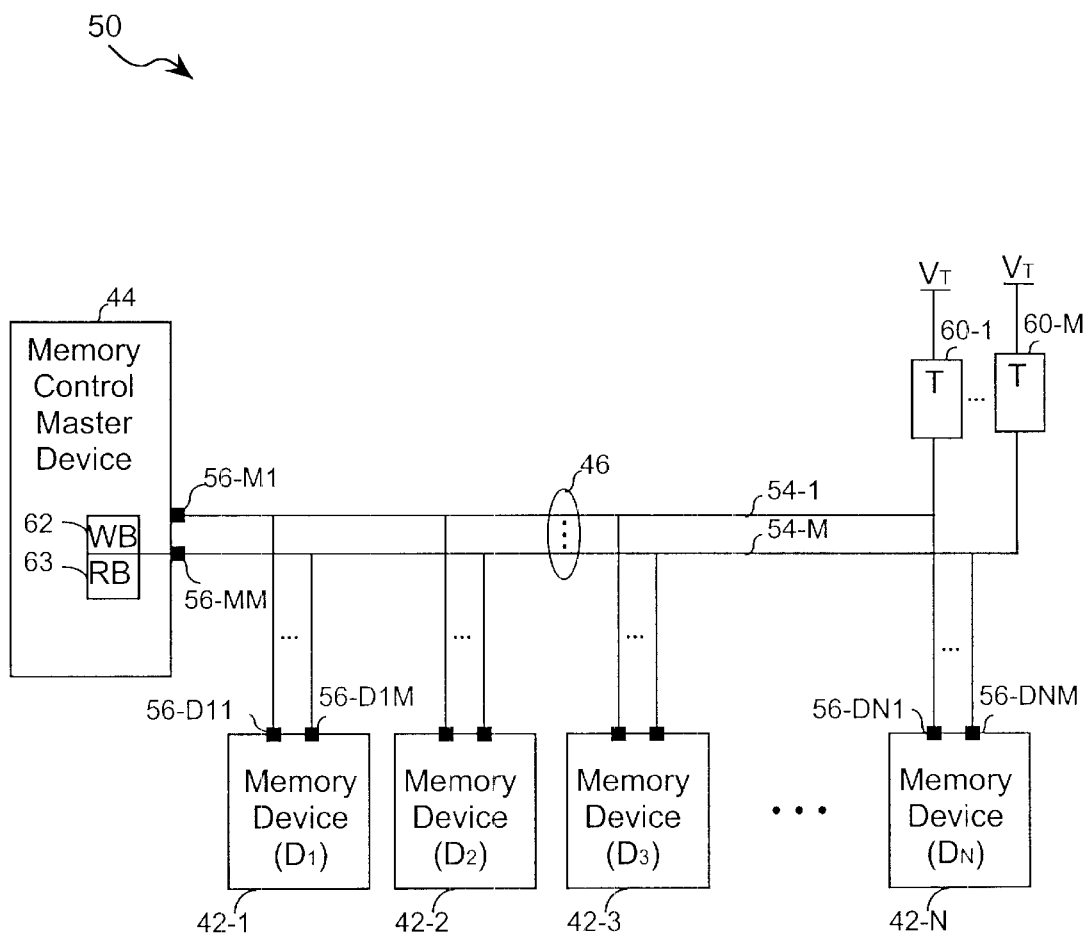
FIG. 1 is a block diagram of a prior art memory system.
Figure 2:
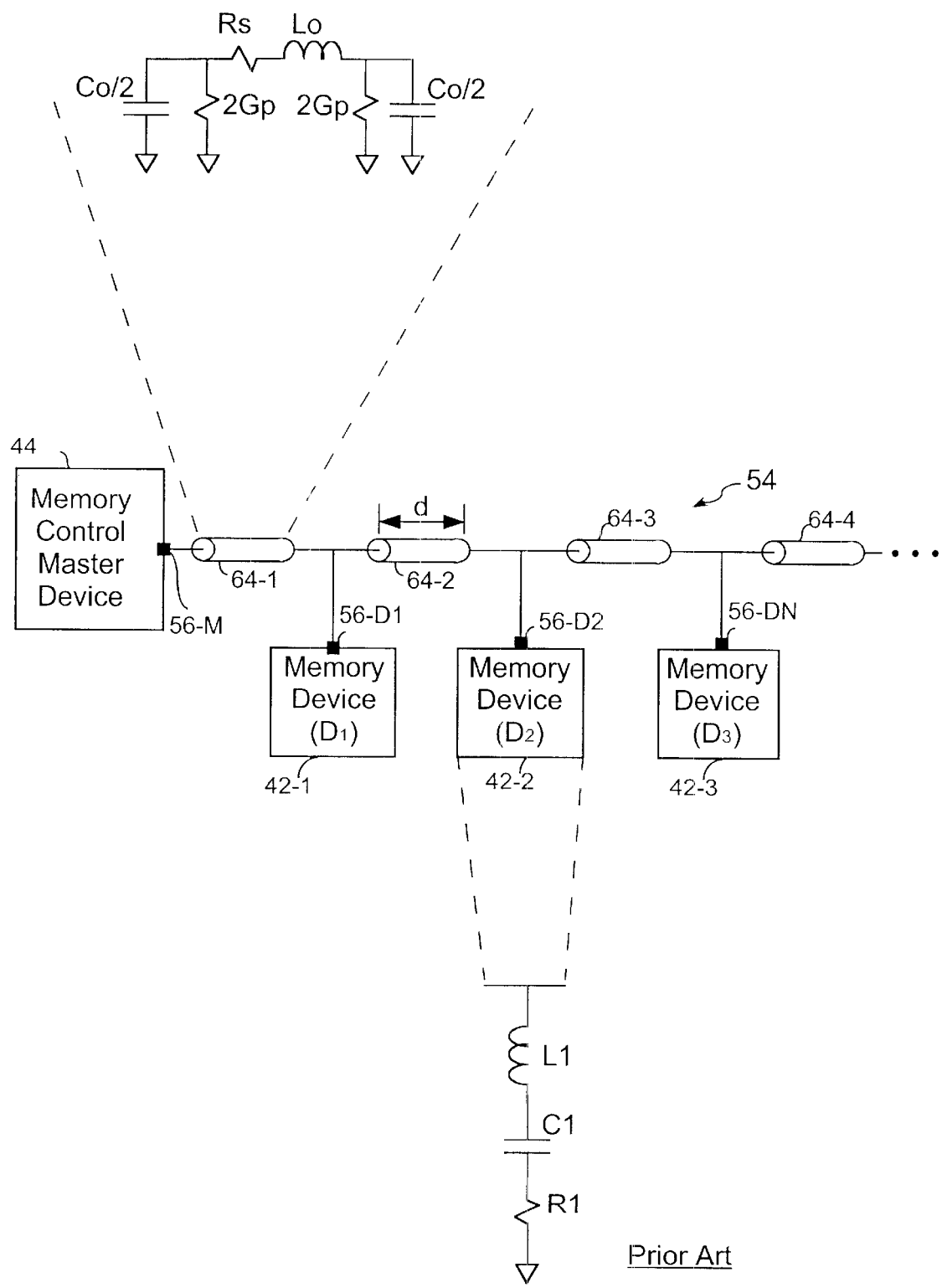
FIG. 2 is diagram of an exemplary signal line of a data bus represented by a transmission line of the prior art memory system of FIG. 1.
Figure 3:
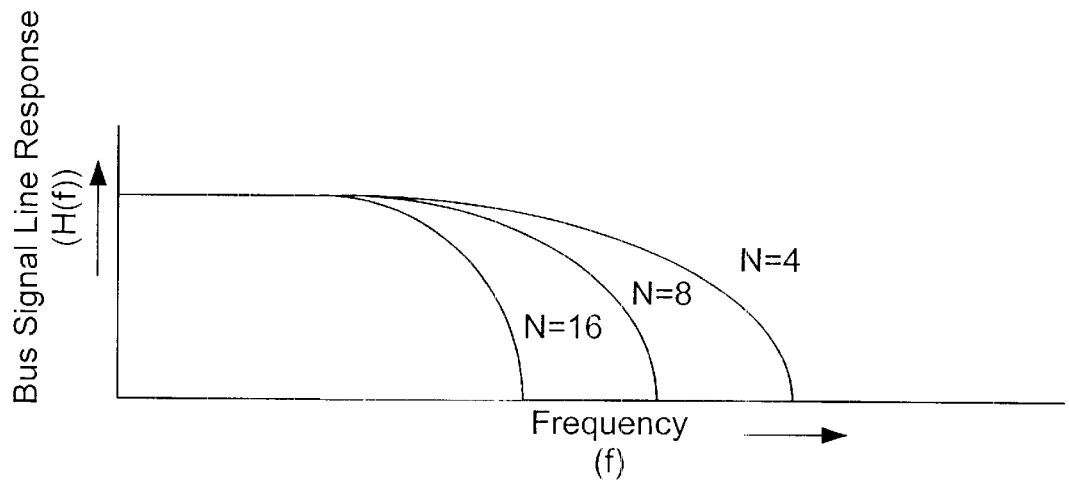
FIG. 3 is a graph of the frequency response of a bus signal line of FIG. 1 when a various number of memory devices are connected to the bus signal line.
Figure 4:
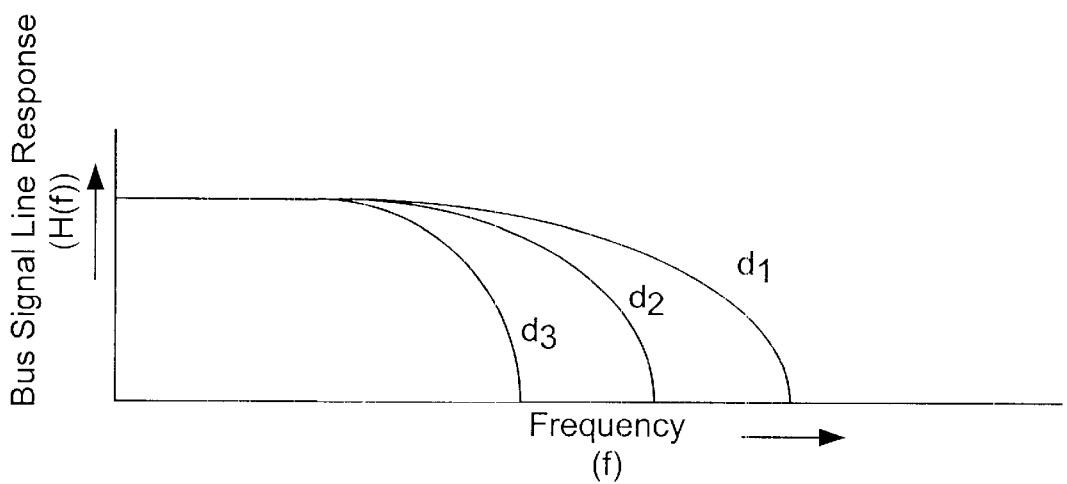
FIG. 4 is a graph of the frequency response of a bus signal line of FIG. 1 at different spacings of memory devices.

In a preferred embodiment, an expandable memory system increases bandwidth and capacity while using the same memory devices as shown in the prior art memory system of FIG. 1. The present invention will be described with respect to random access memory (RAM) devices, however this is not meant to express a limitation on the present invention. The invention described herein may be extended to other types of slave devices, including other types of memories, with minor modification of the disclosure to follow. The expandable memory system also improves bus utilization efficiency by reducing, and in some cases eliminating, read/write bubbles.

A unidirectional bus transmits signals between devices in a one predetermined direction, in contrast to a bidirectional bus which transmits signals between devices in two directions. For example, in a unidirectional bus, the master device transmits signals to the slave devices in one direction; and, the slave devices transmit signals to the master device in that same direction. Therefore, a "circular" path is formed between the master device and the devices. Although signals may propagate in both a desired direction and an opposite direction on a unidirectional bus, the signals that propagate in the opposite direction are undesirable and due to the nature of electrical transmission. In contrast, in a bidirectional bus, the master device and the slave devices transmit signals to each other on the same signal lines in both directions, not necessarily simultaneously.

Figure 5:
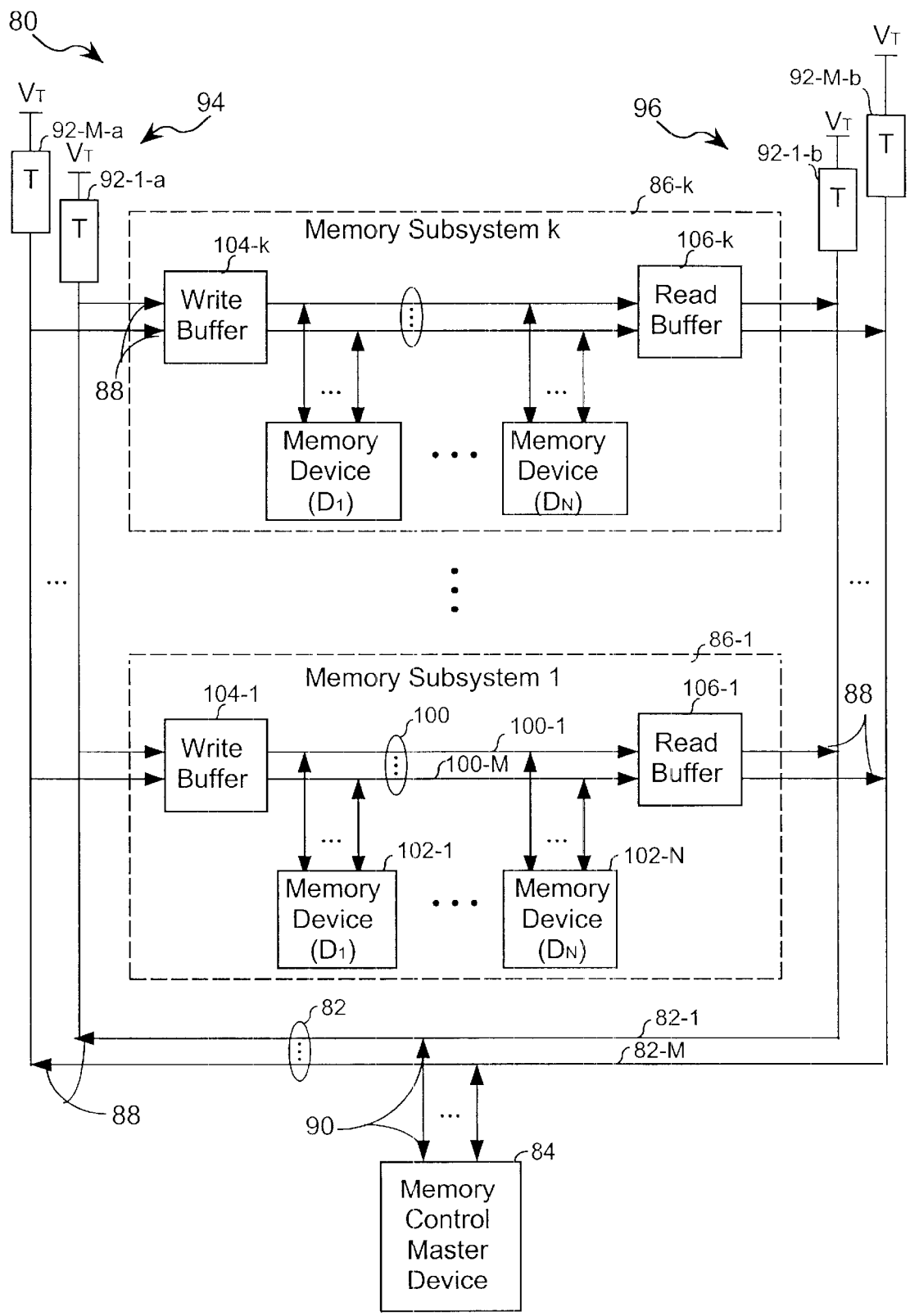
FIG. 5 is a block diagram of an expandable memory system in which one or more memory subsystems are connected in parallel to a master device by a global data bus.

In FIG. 5, in an expandable memory system 80 in accordance with an embodiment of the present invention, a unidirectional global bus 82 interconnects a memory control master device (M) 84 with one or more (k) parallel memory subsystems 86-1 to 86-k. The unidirectional global bus 82 has M signal lines 82-1, 82-M which transport data signals between the memory subsystems 86 and the memory control master device 84. The control signals will be discussed below with respect to FIG. 17. In a preferred embodiment, all signal lines 82 are unidirectional signal lines that transport the data signals in the direction as indicated by arrows 88.

The memory control master device 84 writes data to or reads data from any of the memory devices 102. As shown by arrows 90, the memory control master device 84 transmits control and data signals to and receives control and data signals from the signal lines of the unidirectional bus 82.

In this description, the signal lines of a bus will also be referred to using the same reference numeral as the bus. For example, the bus 82 has a signal line 82.

To provide a specified impedance to reduce reflections, each signal line 82-1 to 82-M of the global bus 82 is terminated with a terminator T 92 at first and second ends of the global bus 82. The terminators 92 pull-up the voltage on the signal lines to a predetermined termination voltage $V_T$.

In each memory subsystem 86, a local unidirectional bus 100 interconnects at least one and up to N memory devices 102, a write buffer 104 and a read buffer 106. The local unidirectional bus 100 has m local signal lines 100-1 to 100-m. In one embodiment, the write buffer 104 and the read buffer 106 are implemented on separate integrated circuits which have I/O pins for connecting to the global and local busses, 82 and 100, respectively. In an alternate embodiment, the write and read buffers, 104 and 106, respectively, are implemented on the same integrated circuit.

To read data from or write data to a particular memory device, the memory control master device 84 sends read and write commands to the memory devices 102 using control signals which include address information. The write buffer 104 receives the control signals from a control bus, which will be discussed below with reference to FIG. 17. The write buffer 104 receives the data signals from the global signal lines, 82-1 to 82-M, of the global unidirectional bus 82. In response to specified control signals from the master device 84, the write buffer 104 sends control signals to the memory devices 102 and the read buffer 106 to read or write data. With respect to transporting data, the write buffers 104 are transceiver devices that receive and re-transmit the data signals from the. global bus 82 to one or more memory devices 102 coupled to one or more of the local buses 100. In one embodiment, to write data to a memory device 102, the master device 84 transmits data onto the data signal lines of the global bus 82. The data is received by the appropriate write buffer 104, which re-transmits the data from the global bus signal lines 82 onto a subset of the signal lines of the local subsystem bus 100 for reception by the appropriate memory device 102.

The read buffers 106 are also transceiver devices for receiving and re-transmitting data signals from one of the local busses 100 to the global bus. To read data from a memory device 102 in response to a command from the memory control master device 84, a memory device 102 in one of the memory subsystems 86 transmits the data onto its local subsystem data bus 100. The read buffer 106 receives the data and re-transmits that data onto the data signal lines 82 of the global data bus 82 for reception by the master device 84. The arrows show the flow of data through the memory system 80.

The memory subsystems 86 also have terminators attached to the local bus 100 which will be depicted and described below with respect to FIGS. 6, 7, 9 and 10. Because data flows through the expandable memory system in one direction, the expandable memory system 80 can simultaneously provide increased bandwidth and capacity while using the same memory devices as in prior art circuit of FIG. 1.

A Memory Sub-system

Figure 6:
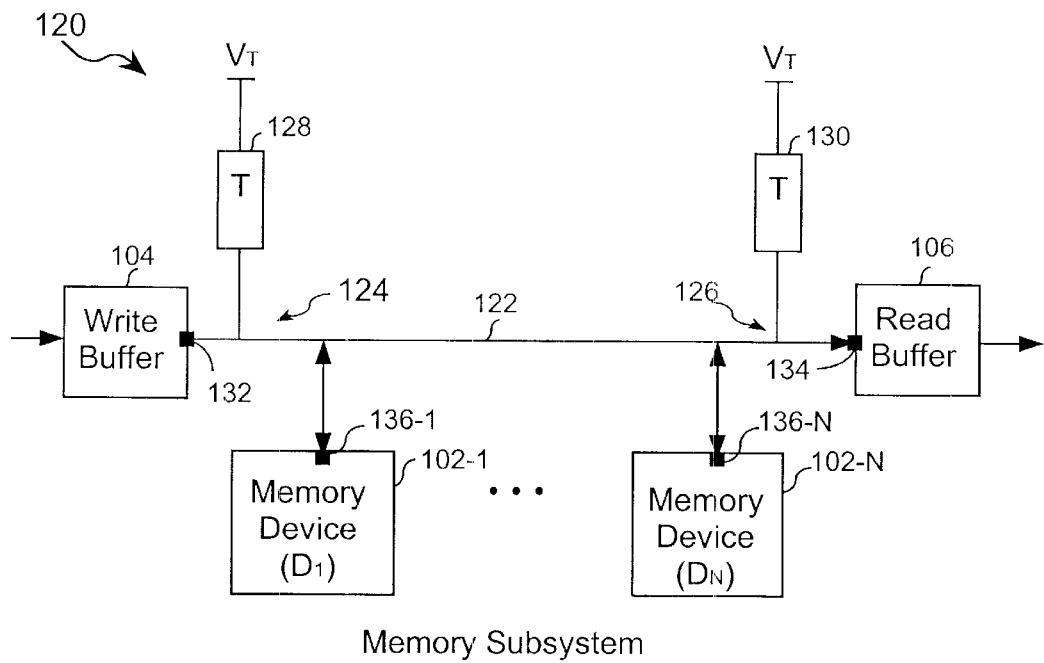
FIG. 6 is a block diagram of an embodiment of a memory subsystem of FIG. 5 that has passive terminators at both ends of a local subsystem bus.

In FIG. 6, in a first embodiment of a memory subsystem 120 for use in the memory system 80 of FIG. 5, a unidirectional local data bus 122 is terminated at first and second ends, 124 and 126, by first and second passive terminators 128 and 130, respectively. The local data bus 122 interconnects one or more memory devices 102, the write buffer 104 and the read buffer 106, as described above with respect to FIG. 5. For simplicity, a single local bus signal line 122 is shown. The local bus 122 has a first end 124 and a second end 126. In this memory subsystem configuration 120, the local bus signal line 122 is terminated at both ends by passive terminators 128 and 130. To use the same memory devices 42 as in the prior art memory system 50 of FIG. 1, the impedance of the signal line 122 is designed to equal twice the value of the loaded impedance $Z_L$, used in the prior art memory system 50 (FIG. 1). Therefore, the terminators 128 and 130 have an impedance substantially equal to twice the loaded impedance $Z_L$.

When driving the local bus signal line 122, the write buffer 104 "sees" the impedance of the first terminator 128 in parallel with the impedance of the local bus signal line 122. Since both the first terminator 128 and the signal line 122 have an impedance substantially equal to twice the loaded impedance $Z_L$, the write buffer 104 "sees" an effective impedance substantially equal to $Z_L$. Therefore, when driving a logical one, the write buffer 104 drives a full swing voltage signal down the local bus signal line 122 using the same amount of current as the master device 44 (FIG. 1) in the prior art memory system 50 (FIG. 1). Alternately, to drive a logical zero or other predefined logical symbol, the drive circuit of the write buffer 104 drives a full swing signal down the signal line 122 using the same amount of current as the drive circuit of the master device 44 (FIG. 1) of the prior art memory system 50 (FIG. 1).

The signal propagates down the local bus signal line 122, passes each memory device 102, and terminates at the second passive terminator 130 at the second end 126 of the local bus signal line 122. In one embodiment, the first and second passive terminators, 128 and 130, are connected to I/O pins, 132 and 134, of the write buffer and read buffer, 104 and 106, respectively. Alternately, the first and second passive terminators, 128 and 130, are connected sufficiently close to the I/O pins, 132 and 134, of the write buffer and read buffer, 104 and 106, respectively, for proper system operation.

When a memory device 102 drives the local bus signal line 122, the memory device 102 "sees" an effective impedance substantially equal to $Z_L$ at its I/O pins 136. In other words, the memory device 102 "sees" substantially twice the effective impedance $Z_L$ in either direction. Therefore, the same memory devices 42 with the same amount of drive current as in the prior art memory system 50 of FIG. 1 can be used in the memory subsystem 120.

In this embodiment, the memory device's drive circuits simultaneously drive full-swing signals towards the first and second ends, 124 and 126, respectively, of the local bus signal line 122. The signals terminate at their respective passive terminators 128 and 130 at the ends of the local bus signal line 122, allowing the read buffer 106 to sense a full swing input signal at it I/O pin 134 without the need for the doubling of the voltage swing as described with respect to the prior art memory system 50 of FIG. 1.

In this embodiment, the same memory devices 42 as used in the prior art memory system 50 of FIG. 1 can be used. In addition, the drive circuit of the write buffer 104 can use the same size drive transistors as used in the drive circuit of the master device 44 of the prior art memory system 50 of FIG. 1. Furthermore, when reading data from the memory devices 102, because the signals from the memory devices 102 terminate at the passive terminator 130 at the read buffer 104, a high precision, high impedance on-chip termination at the read buffer I/O pin 134 is not needed.

In other words, the importance of the parasitic electrical characteristics of the read buffer I/O pin 134 is substantially less than that of the master device I/O pin 56-M in the prior art memory system 50 of FIG. 1. Assuming equivalent voltage swings, the memory subsystem 120 requires no more power to drive the local bus signal line 122 than was required in the prior art memory system 50 of FIG. 1.

In addition, the bus signal line 122, which has twice the loaded impedance as that of the prior art system 50 (FIG. 1), uses signal line segments with higher characteristic impedance between the memory devices 102 to provide the desired, higher loaded impedance. Increasing the distance, d, between memory devices 102 effectively distributes their input capacitances, and allows the higher loaded impedance. In this embodiment, the distance d between adjacent memory devices 102 is limited to approximately the electrical length of the rise and/or fall times of the signals on the signal line 122.

In one embodiment, the passive terminator 130 is a resistor. In an alternate embodiment, the passive terminator 130 is implemented with transistors. In another alternate embodiment, the passive terminators 128 and 130 are implemented on the same chip as the write buffer 104 and read buffer 106 to further reduce reflections by reducing the distance between the terminators 128 and 130 and the drive circuits of the write buffer 104 and receivers of the read buffer 106, respectively.

A Second Embodiment of a Memory Sub-system

Figure 7:
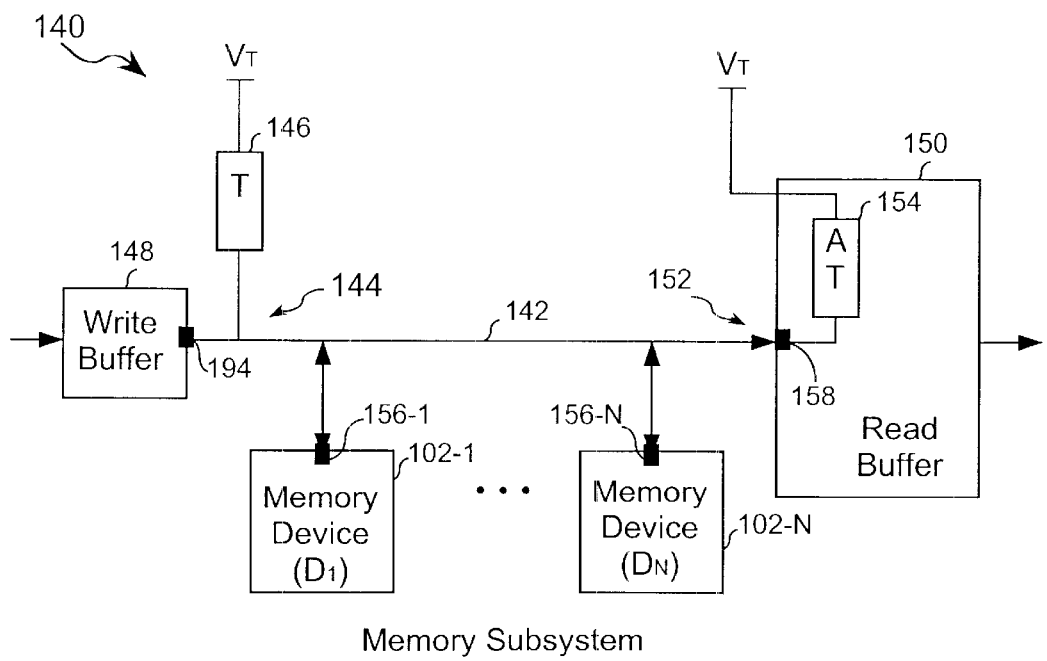
FIG. 7 is a block diagram of an alternate embodiment of a memory subsystem of FIG. 5 that has a passive terminator at a write buffer end of a signal line of the local subsystem bus and an active terminator at a read buffer end of the signal line of the local subsystem bus.

FIG. 7 shows another embodiment of a memory subsystem 122 for use in the memory system 80 of FIG. 5. Like the memory subsystem 120 of FIG. 5, the local bus signal line 142 is terminated at a first end 144 by a passive terminator 146 at a write buffer 148. However, in a read buffer 150, a second end 152 of the local bus signal line 142 is terminated by a switchable, active terminator (AT) 154. Although the local bus has many local bus signal lines, for simplicity, a single local bus signal line 142 will be described.

This configuration 140 uses the same loaded channel impedance, $Z_L$, as the prior art memory system 50 (FIG. 1); and, both the passive terminator 146 and the active terminator 154, when active, match this impedance $Z_L$.

This embodiment of the memory subsystem 140 operates as follows. When the write buffer 148 transmits data onto the local bus signal line 142, the write buffer 148 "sees" the impedance of the passive terminator 146 in parallel with the impedance of the local bus signal line 142 for an effective impedance equal to one-half of the loaded impedance $Z_L$. To drive a full swing signal down the local bus signal line 142, the drive circuit of the write buffer 148 sinks twice as much current as the drive circuit of the write buffer 104 of FIG. 6.

The signal propagates down the local bus signal line 142, passes each memory device 102, and terminates at the active terminator 154 in the read buffer 150. For proper termination, the active terminator 154 is activated and provides an impedance approximately equal to the loaded impedance $Z_L$ when the signal from the write buffer 148 arrives at the read buffer 150.

When any of the memory devices 102 drive the local bus signal line 142, the situation is identical to that of when the memory devices 42 (FIG. 1) drive the bus signal line 54 of the prior art memory system 50 of FIG. 1. Each drive circuit in the memory device 102 "sees" two signal lines—one towards the write buffer 148 and one towards the read buffer 150 for a net impedance equal to one-half of the loaded impedance $Z_L$. Therefore, the signals that emerge from the memory device I/O pins 156 split at the local bus signal line 142 with one-half of the signal voltage traveling towards the write buffer 148 and half towards the read buffer 150. The signal that travels towards the write buffer 148 terminates at the matched impedance of the passive terminator 146. The signal that travels toward the read buffer 150 encounters an open circuit when it reaches the end 152 of the local bus signal line 142 at a read buffer I/O pin 158. The open circuit doubles the signal voltage at the I/O pin 158 of the read buffer 150 as the signal energy is reflected back down the local bus signal line 142 towards the write buffer 148. Although half the voltage was sent by the memory device 102 towards the read buffer 150, the read buffer 150 "sees" a full swing signal at its I/O pin 158, provided that the bus signal line 142 terminates in a high impedance at the buffer 150. Therefore, the active terminator 154 is effectively deactivated to provide an open circuit, when signals from any of the memory devices 102 reach the I/O pins 158 of the read buffer 150.

The main advantage of memory subsystem 140 is that, with respect to the pins 156 of the memory devices 102, the local bus signal line 142 appears identical to that of the prior art memory system 50 of FIG. 1. Therefore, the memory subsystem 140 can support the same bandwidth and capacity as the prior art system 50 (FIG. 1) without modifying the memory devices 42 of the prior art system 50 of FIG. 1. However, the drive circuits of the write buffer 148 drive twice the amount of current as the drive circuits of the master device 44 of FIG. 1. In addition, memory system 140 uses an on-chip, active terminator 154 in the read buffer 150. In the active state, the active terminator 154 has an impedance that is substantially equal to the impedance of the loaded channel 142. In the inactive state, the active terminator 154 provides an open-circuit termination. The transition time of the active terminator 154 between the active and inactive states directly impacts the efficiency of the memory subsystem 140. The transition time determines the amount of time between reliable reads from and writes to the memory devices 102. A bit-time is a predefined amount of time during which one bit is transmitted. Alternately, a bit-time is a predefined amount of time during which one symbol representing two or more bits is transmitted. Preferably, the transition time of the active terminator 154 is much less than one bit-time so that data can be written immediately after reading data with no unusable bit times between the writes and reads, and also so that data can be read immediately after writing data with no unusable bit times between the reads and writes.

In an alternate embodiment, the active terminator 154 is implemented on a separate chip from that of the read buffer 150. Preferably the active terminator 154 is implemented on the same chip as the read buffer 150 to minimize the number of external components, board space, and stub length from the input receivers on the read buffers to the active terminators 154.

In one embodiment, the passive terminator 146 is implemented on the same chip as the write buffer 148. In an alternate embodiment, the passive terminator 146 is implemented separate from the chip that implements the write buffer 148. When implemented separately from the write and read buffer chips, the terminators 146 and 154 are connected sufficiently close to the I/O pins of the read and write buffer chips, respectively, to ensure proper system operation.

Active Terminators

Figure 8A:
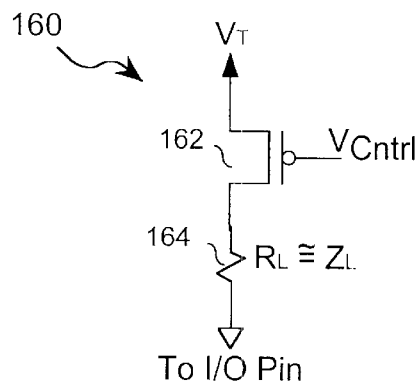
FIG. 8A is a circuit diagram of an embodiment of an active terminator.

FIGS. 8A, 8B, 8C and 8D show four implementations of the active terminator 154 of FIG. 7. In FIG. 8A, a first implementation of an active terminator 160 has a PMOS transistor 162 connected in series with a resistor 164. In one embodiment, resistor 164 is implemented using one or more transistors. One end of the PMOS transistor 162 connects to a termination voltage $V_T$, and one end of the resistor 164 connects to its respective I/O pin or bus signal line close to the I/O pin. To place the active terminator 160 in an active state, the control voltage Vcntrl on the gate of the PMOS transistor 162 is pulled low (i.e. to ground). To place the active terminator 160 in an inactive state, the control voltage Vcntrl is pulled high (i.e. to the termination voltage $V_T$) which causes the transistor 162 to have a high impedance. When in an active state, the active terminator 160 provides an output impedance substantially equal to $Z_L$. To ensure a linear output resistance from the active terminator 160 in its active state, the resistor 164 is implemented as a transistor and is sized to provide most of the active terminator's output resistance. In other words, the resistor 164 is designed to have a resistance slightly less than the loaded impedance $Z_L$ of the local subsystem channel 142 (FIG. 7). The PMOS transistor 162 is sized to be sufficiently large such that when active, the PMOS transistor 162 contributes very little to the output resistance of the active terminator 160. The PMOS transistor 162 drops only a small fraction of the total voltage across the active terminator 160 when the voltage its I/O pin is pulled to its lowest state. For example, in one implementation in which a digital high voltage $V_{Hi}$ is equal to the termination voltage $V_T$ of 1.8 volts (V), the loaded impedance $Z_L$ of the bus signal line is equal to 28 ohms, and the digital low voltage $V_{Lo}$ is equal to 0.8V, the value of resistor 164 is equal to 25 ohms. When the voltage at the I/O pins is pulled down to 1.0V, a voltage drop of approximately 0.7V appears across the resistor 164 and approximately 0.1V appears across the PMOS transistor 162. In this manner, the PMOS transistor 162 and the resistor 164 form an impedance-matched, switchable active terminator 160.

A Second Embodiment of an Active Terminator

Figure 8B:
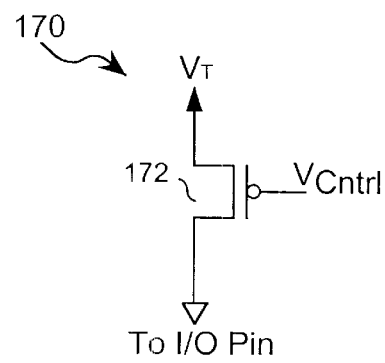
FIG. 8B is a circuit diagram of an alternate embodiment of an active terminator.

FIG. 8B shows a second implementation of an active terminator 170 with reduced complexity. The active terminator 170 has a PMOS transistor 172. The PMOS transistor 172 is sized such that its large-signal output resistance is equal to the loaded impedance $Z_L$ at the center of its voltage swing. In one implementation, the PMOS transistor 172 is sized to have a 28 ohm large signal output resistance when the voltage at the I/O pin is pulled down to 1.4V. Although the active terminator 170 provides an output resistance that is less linear that of the active terminator 160 (FIG. 8A), simulations indicated that the active terminator 170 is sufficiently linear to provide an acceptable termination. For example, in the simulation, the output resistance varied from 17 to 45 ohms over the range of voltage swing $V_{Swing}$. The parasitic capacitance of the active terminator 170 did not significantly affect the termination impedance and, therefore, impede the proper operation of the memory subsystem of FIG. 7.

A Third Embodiment of an Active Terminator

Figure 8C:
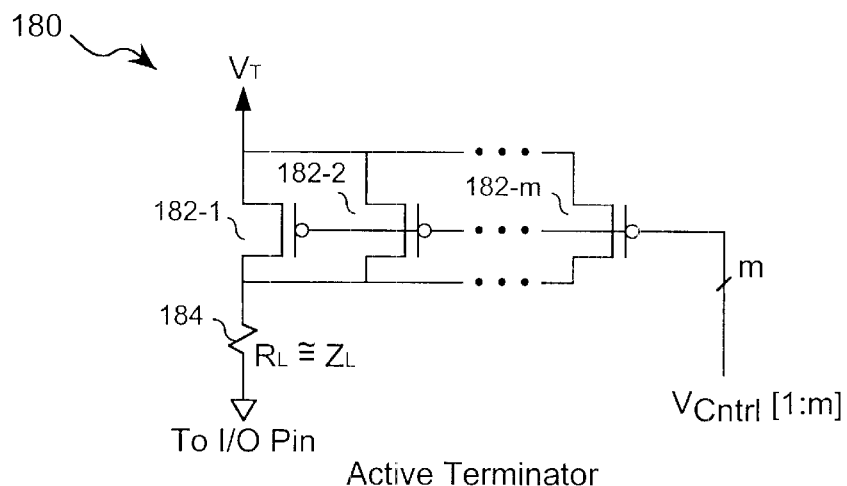
FIG. 8C is a circuit diagram of another alternate embodiment of an active terminator.

FIG. 8C shows another alternate-embodiment of an active terminator 180 that uses a set of m control signals Vcntrl[1:m] to selectively activate and deactivate respective PMOS transistors 182. The active terminator 180 of FIG. 8C is the same as the active terminator 160 of FIG. 8A except that multiple PMOS transistors 182 are connected in parallel, rather than using a single PMOS transistor 162. One control signal of the set of control signals Vcntrl[1:m] connects to a respective PMOS transistor. In this way, by selectively activating and deactivating transistors 182, the impedance of the active terminator 180 can be finely controlled.

A Fourth Embodiment of an Active Terminator

Figure 8D:
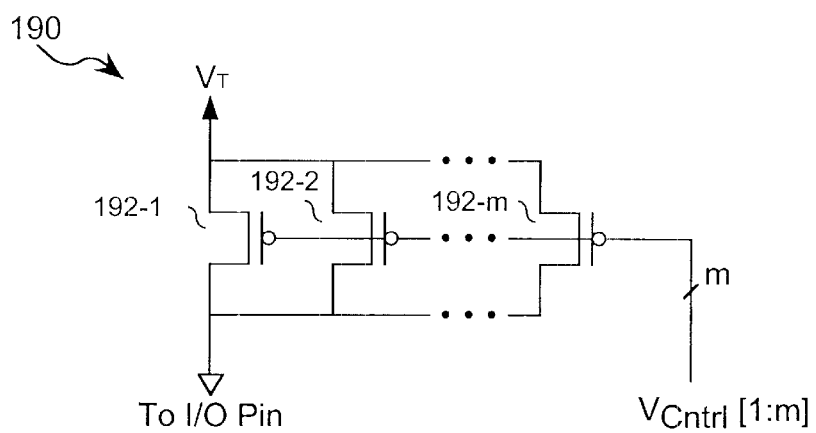
FIG. 8D is a circuit diagram of yet another alternate embodiment of an active terminator.

FIG. 8D shows yet another alternate embodiment of an active terminator 190 that uses a set of m control signals Vcntrl[1:m] to selectively activate and deactivate respective PMOS transistors 192. The active terminator 190 of FIG. 8D is the same as the active terminator 170 of FIG. 8B except that multiple PMOS transistors 192 are connected in parallel, rather than using a single PMOS transistor 172. One control signal of a set of control signals Vcntrl[1:m] connects to a respective PMOS transistor. In this way, by selectively activating and deactivating transistors 192, the impedance of the active terminator 190 can be finely controlled.

A Third Embodiment of a Memory Sub-system

Figure 9:
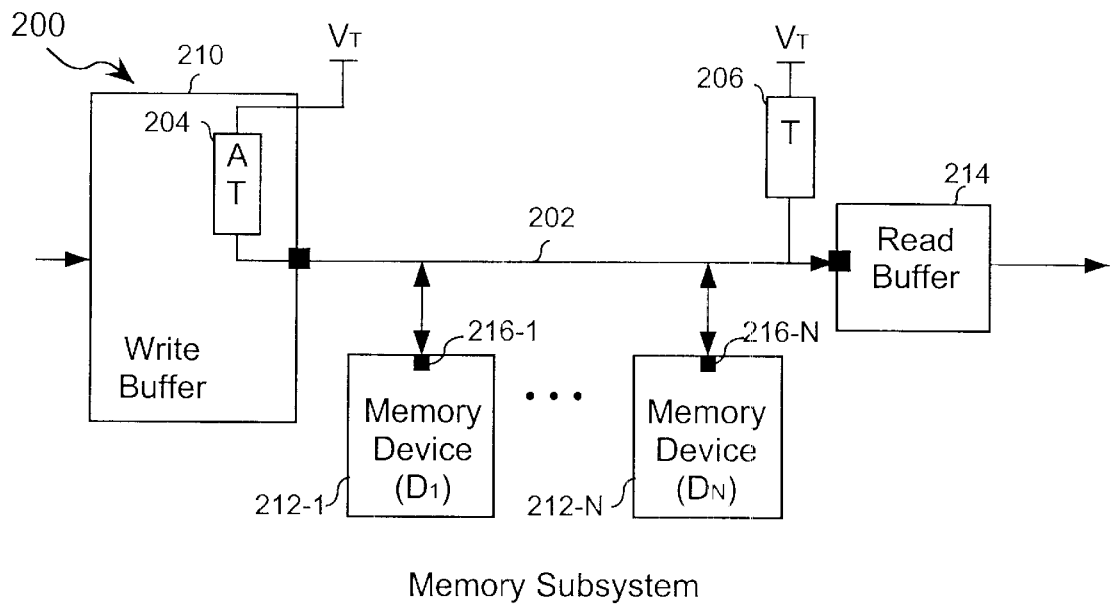
FIG. 9 is a block diagram of another alternate embodiment of a memory subsystem of FIG. 5 that has an active terminator at the write buffer end of the local subsystem bus and a passive terminator at the read buffer end of the local subsystem bus.

FIG. 9 shows yet another embodiment of a memory subsystem 200 for use in the memory system 80 of FIG. 5. Like memory subsystem 140 of FIG. 7, the local bus signal line 202 in this memory subsystem 200 is terminated using both an active terminator 204 and a passive terminator 206. Although the local bus 202 has many local bus signal lines, for simplicity, a single local bus signal line 202 will be described. The local bus signal line 202 is terminated in a write buffer 210 with the active terminator 204 and is terminated at the read buffer 212 with the passive terminator 206. In this embodiment 200, the loaded impedance, $Z_L$, of the local bus signal line 202 is the same as that of the prior art memory system 50 (FIG. 1) and both the active terminator 204 (when active) and the passive terminator 206 match the loaded impedance, $Z_L$.

When writing data to a memory device, the write buffer 210 transmits data onto the local bus signal line 202 With the active terminator 204 in the inactive state. The write buffer 210 "sees" the impedance of the local bus signal line 202 as having an effective impedance equal to $Z_L$. To drive a full swing signal down the local bus signal line 202, the drive circuit of the write buffer 210 sinks one-half the current of memory subsystem 120 of FIG. 6 and the memory subsystem 140 of FIG. 7. This is an advantage since the write buffer 200 sinks the same amount of current as that of the prior art system 50 of FIG. 1. The signal from the write buffer 210 propagates down the local bus signal line 202, passes each memory device 212, and terminates at the passive terminator 206.

When any of the memory devices 212 drive the local bus signal line 202 with the active terminator 204 in the active state, each drive circuit in the memory device 212 "sees" two signal lines (one towards the write buffer 210 and one towards the read buffer 214) for a net impedance equal to one-half of the loaded impedance $Z_L$. The signals that emerge from the memory device I/O pin 216 split at the bus signal line 202 with one-half of the signal voltage traveling towards the write buffer 210 and one-half of the signal voltage traveling towards the read buffer 214. The signal that travels towards the write buffer 210 terminates at the matched impedance of the active terminator 204. The signal that travels towards the read buffer 214 terminates at the matched impedance of the passive terminator 206 at the end of the bus signal line 202 at the read buffer 214. Because one-half of the voltage from the memory devices 212 reaches the read buffer 214, the memory devices 212 drive the channel with twice the amount of current of the prior art memory system 50 of FIG. 1.

One advantage of the memory subsystem 200 is that with respect to the write buffer 210, the bus signal line 202 appears identical to that of the prior art memory system 50 of FIG. 1. Therefore, the memory subsystem 200 can support the same bandwidth and capacity as the prior art system 50 of FIG. 1. However, the memory devices 212 drive twice as much current as the memory devices 42 of FIG. 1.

In one embodiment, the active terminator 204 is on the same integrated circuit as the write buffer 210. Alternately, the active terminator 204 is on a separate integrated circuit from the write buffer 210. When active, the active terminator 204 provides the same characteristics as the passive terminator 146 of FIG. 7. In addition, the active terminator 204 may be implemented using any of the embodiments of FIGS. 8A, 8B, 8C and 8D.

The passive terminator 206 is connected to the I/O pin of the read buffer 214. Alternately the passive terminator 206 is connected sufficiently close to the I/O pin of the read buffer to ensure proper system operation. In another embodiment, the passive terminator 206 is fabricated on the same chip as the read buffer 214.

A Fourth Embodiment of a Memory Subsystem

Figure 10:
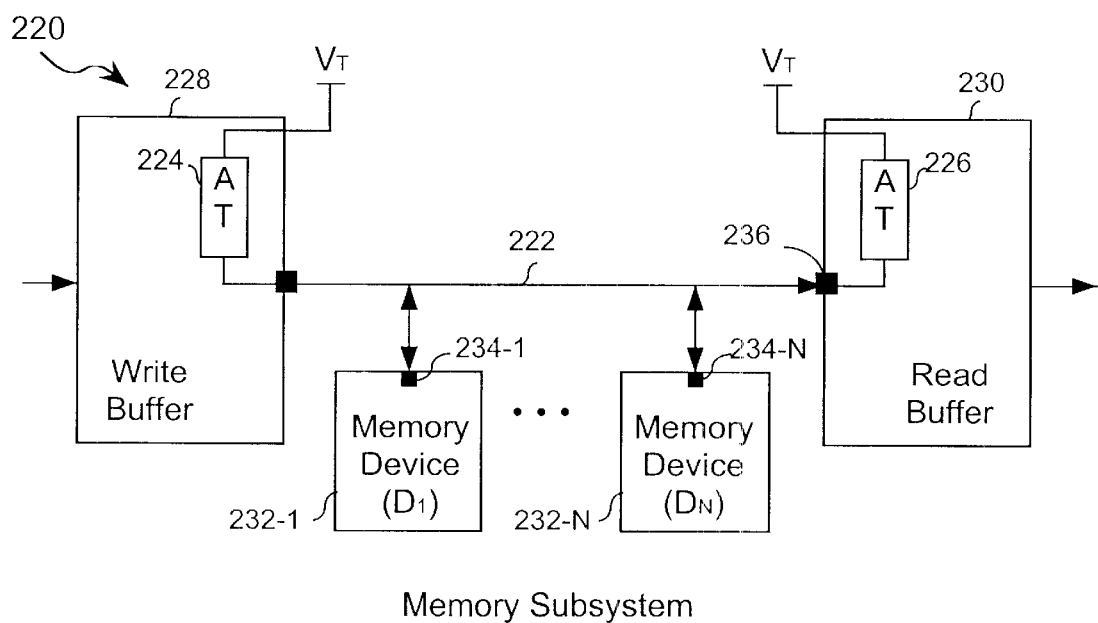
FIG. 10 is a block diagram of yet another alternate embodiment of a memory subsystem of FIG. 5 that has active terminators at both ends of the local subsystem bus.

FIG. 10 shows a fourth embodiment of a memory subsystem 220 for use in the memory system 80 of FIG. 5. In the memory subsystem 220, both ends of a local bus signal line 222 are terminated by a switchable, active terminator 224 and 226 in the write and read buffers, 228 and 230, respectively. Although the local bus has many local bus signal lines, for simplicity, a single local bus signal line 222 will be described. When active, the active terminators 224 and 226 provide the same loaded channel impedance, $Z_L$, as that of the prior art memory system 50 of FIG. 1. The active terminators 224 and 226 in this embodiment 220 can be implemented using any of the active terminators shown in FIGS. 8A, 8B, 8C and 8D.

When the write buffer 228 transmits data onto the local bus signal line 222, the active terminator 224 at the write buffer 228 is in an inactive, high impedance state. Therefore, the drive circuits in the write buffer 228 "see" the impedance of the local bus signal line 222 as having an effective impedance of $Z_L$. To drive a full swing signal down the local bus signal line 222, the same drive circuits as used in the master device 44 of the prior art system of FIG. 1 can be used. The write data signal propagates down the local bus signal line 222, passes each memory device 232, and terminates at the active terminator 226 in the read buffer 230. For proper termination, the active terminator 226 in the read buffer 230 is activated (i.e. provides an impedance of approximately $Z_L$ ohms) when the signal from the write buffer 228 arrives at the read buffer 230.

During a read operation, when any of the memory devices 232 drive data onto the local bus signal line 222, each drive circuit in the memory device 232 effectively "sees" two signal lines (one towards the write buffer 228 and one towards the read buffer 230) for a net impedance equal to one-half $Z_L$. Therefore, the signals that emerge from the memory device I/O pins 234 split at the bus signal line 222 with one-half of the signal voltage traveling towards the write buffer 228 and one-half of the signal voltage traveling towards the read buffer 230. The active terminator 224 in the write buffer 228 is activated such that when the signal that travels toward the write buffer 228 reaches the write buffer 228, that signal terminates at the matched impedance of the active terminator 224 and reflections are minimized. However, the active terminator 226 at the read buffer is deactivated such that the signal that travels toward the read buffer 230 encounters an open circuit when it reaches the end of the bus signal line 222 at the read buffer I/O pin 236.

The open circuit at the active terminator 226 doubles the signal voltage at the I/O pins of the read buffer 230 as the signal energy is reflected back down the local bus signal line 222 towards the write buffer 228. Although one-half of the voltage is transmitted by the memory device 232 towards the read buffer 230, the read buffer 230 still "sees" a full swing signal at its I/O pin 232, provided that the local bus signal line 222 terminates with a high impedance at the read buffer 230. The active terminator 226 in the read buffer 230 is deactivated when signals transmitted by any of the memory devices 228 reach the I/O pin 236 of the read buffer 230.

The main advantage of the memory subsystem 220 is that with respect to both the write buffer 228 and the memory devices 232, the local bus signal line 222 appears identical to signal line 54 of the prior art memory system 50 of FIG. 1. Therefore, a single memory subsystem 220 provides the same bandwidth and capacity as the prior art system 50 of FIG. 1. To increase capacity while maintaining the same bandwidth, multiple memory subsystems 220 are used.

Preferably, the memory subsystem 220 uses on-chip, active terminators 224 and 226 at both the write and read buffers, 228 and 230, respectively. Synchronizing the active and inactive states of the two active terminators 224 and 226 increases system complexity. Furthermore, the write buffer 228 does not transmit data until all read signals have been absorbed at the write buffer's active terminator 224 before deactivating the active terminator 224 to transmit data. This waiting time increases the system latency and reduces the bus utilization efficiency.

Embodiments of the individual memory subsystems have been discussed. Each embodiment relays data from the unidirectional global bus to the unidirectional local bus and to the memory devices, and relays data from the individual memory devices to the unidirectional local bus and to the unidirectional global bus. Additional embodiments of the global bus system 80 will now be discussed.

The Global Bus System

Referring back to FIG. 5, the signal lines of the global bus 82 are terminated at both ends by matched, resistive terminators 92. Therefore, the drive circuits in the master device 84 "see" an effective impedance equal to one-half of the loaded impedance of the global bus 82, $Z_{LG}$, (i.e., the drive circuits "see" one-half $Z_{LG}$). When a drive circuit of the master device 84 drives a signal onto a signal line of the global bus 82, that signal splits with one-half of the energy traveling in each direction and terminates at the respective terminators 92. The drive circuits provide signals of sufficient amplitude that can be reliably detected by the input receivers of the last write buffer 94-k. One-half of the energy transmitted by the master device 84 is dissipated because a portion of the signal propagates toward the read buffers 106. The drive circuits of the read buffers 106 "see" an effective impedance equal to one-half of the loaded impedance of the global bus, $Z_{LG}$, and dissipate one-half of their energy transmitting toward the terminator 92 at the last read buffer 106-k.

The global bus utilization efficiency of this configuration 80 is limited because the master device 84 cannot use the global data bus to simultaneously read and write data. To maximize the global bus utilization efficiency of this configuration 80, the drive circuits in the read buffers 106 drive data received from a memory device 102 while write data from the write buffer 104 passes the pins of the memory devices 102 towards the terminator at or in the read buffer 106. The drive circuits provide a high output impedance even when the voltage at their pins is equal to $V_T - 2*V_{Swing}$. An advantage of memory system 80 is that it uses fewer pins on the master device 84 because the same pins are used for both receiving global read data and transmitting global write data.

In one embodiment, the global bus and local bus use the same signaling, and operate at the same data rate. Alternately, the global bus and local bus operate at different data rates, and use different signaling.

Two Unidirectional Buses Used as a Global Bus System

Figure 11:
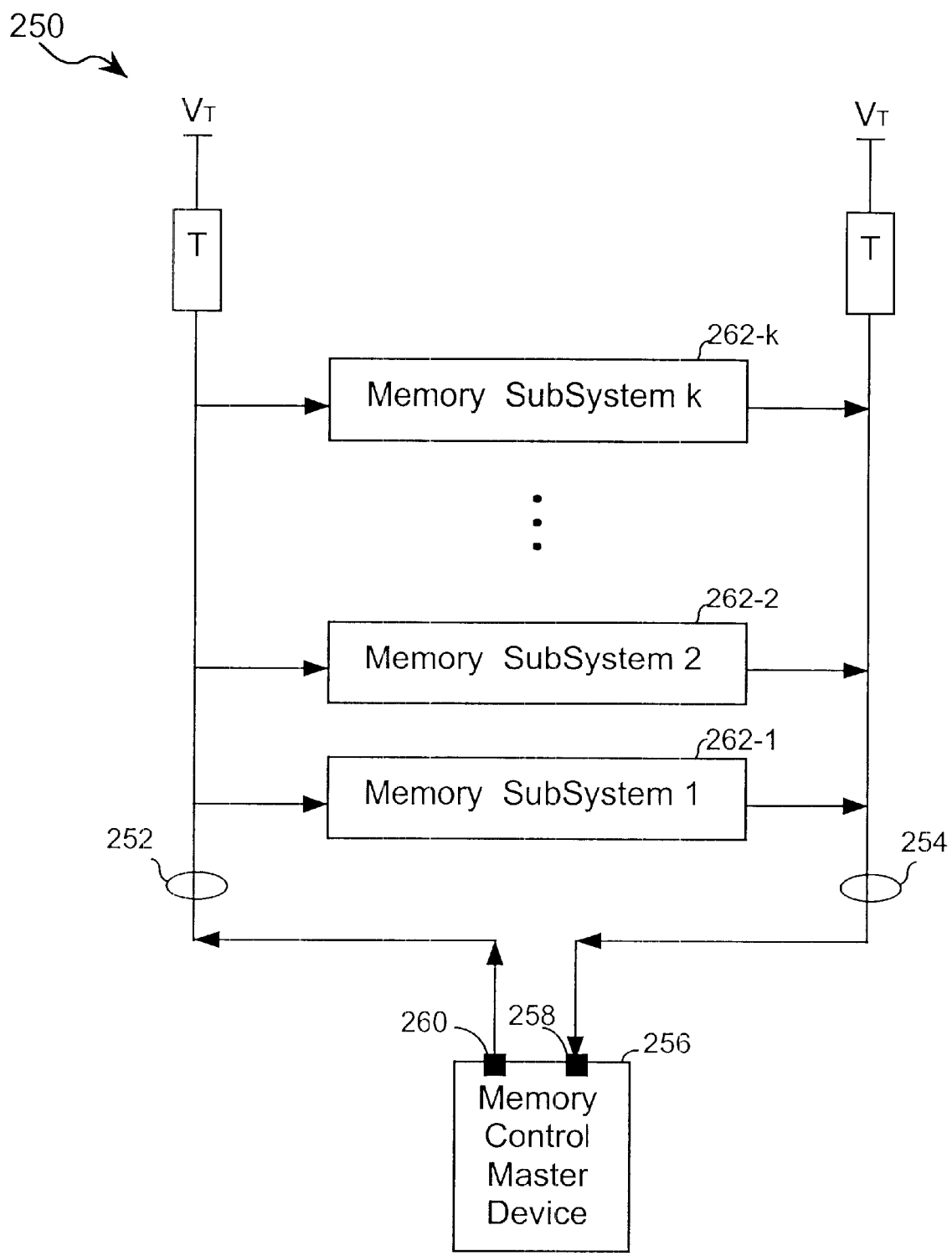
FIG. 11 is a block diagram of an alternate embodiment of the memory system of the present invention that has a global bus including two separate unidirectional buses.

FIG. 11 is a block diagram of an alternate embodiment of a memory system 250. Structurally, memory system 250 is the same as the memory system 80 of FIG. 5 except that the global bus 82 (FIG. 5) is divided into two parts: a global write bus 252 and a global read bus 254. Although each bus has many signal lines, for simplicity, only one signal line is shown and will be referred to using the same reference numeral as the bus. On the master device 256, the I/O pins 258 for receiving data from the global read bus 254 are different from the I/O pins 260 for transmitting write data. Therefore, the master device 256 uses more external pins which increases the cost of the package, board and integrated circuit. An advantage to the memory system of FIG. 11 is that the drive circuits on the master device 256 drive one-half of the amount of current of the drive circuits of the master device 84 of FIG. 5 to provide the same signal amplitude to the receiver circuits in the write buffers. In addition, the drive circuits of the read buffers of the memory subsystems 262 of FIG. 11 need only drive one-half of the current of the drive circuits of the read buffers 106 of FIG. 5 because of the voltage doubling effect at the input pins of the master device 256. Additionally, the master device 256 simultaneously transmits and receives data, doubling the bandwidth, and therefore the data rate, of the memory subsystem 250.

The expandable memory systems of FIGS. 5 and 11 increase the memory capacity as compared to the prior art memory system 50 of FIG. 1. The expandable memory system of FIGS. 5 and 11 also increases bandwidth while using the same memory devices as the prior art of FIG. 1, regardless of which of the two global bus configurations (FIG. 5 and FIG. 11) are used because the signaling on the global bus does need not be the same as the signaling on the local subsystem buses. Higher speed signaling schemes can be used between the master device and the write buffers, and between the read buffers and the master device. For example, in an alternate embodiment, the global signaling transmits symbols, where each symbol represents more than one bit.

In another embodiment, the signaling takes advantage of the unidirectional nature of the data flow on the global system bus and the reduced number of repetitive loads on the global bus as compared to that of the local subsystem buses by interleaving data exchanged with different subsystems. In this embodiment, the global bus has a higher bandwidth than the local subsystem busses. The higher bandwidth global bus transports interleaved information to more than one memory device on different subsystems to increase the effective memory access bandwidth without changing the memory devices used in the system. In yet another embodiment, to implement interleaving, separate control packets are sent for each memory request to different subsystems and modules.

Timing

Figure 12:
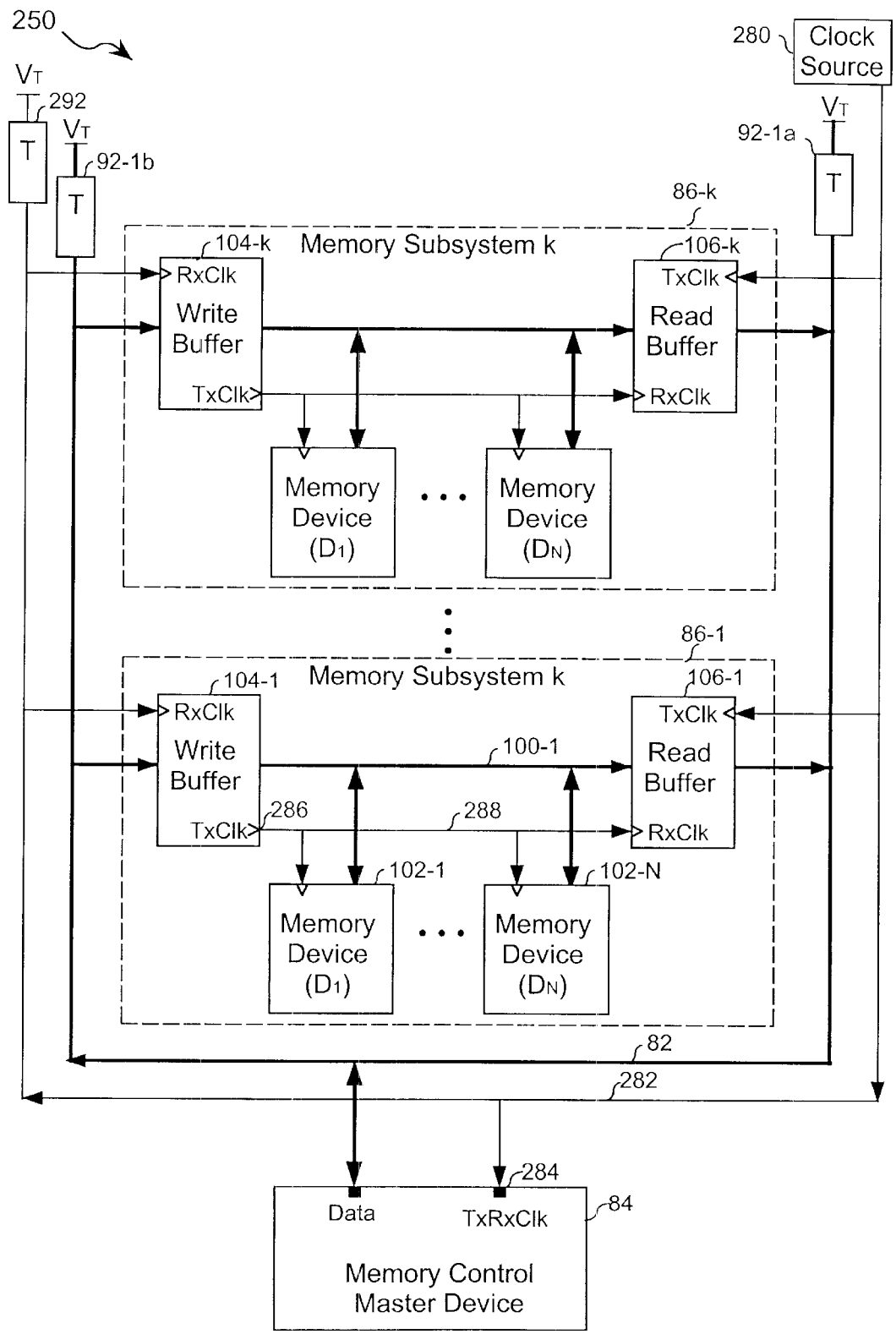
FIG. 12 is a more detailed block diagram of the memory system of FIG. 5 that shows at least one global clock signal line parallel to the unidirectional global data bus of the present invention.

FIG. 12 is a block diagram illustrating a clocking configuration for the expandable memory system of FIG. 5. Data on the global bus is transported synchronously with at least one global clock signal. A clock source 280 provides a global clock signal that travels on one or more global clock signal lines 282 in parallel with the global bus 100. In one embodiment, a differential clock signal is provided using two signal lines. Data transmitted by the read buffers 106, referred to as read data, to the master device 84 is transmitted synchronous to and in parallel with the global clock signal. The read data and the global clock signals have substantially the same propagation characteristics and maintain a substantially constant phase relationship while propagating from the read buffers 106 to the master device 84.

Data transmitted by the master device 84, referred to as write data, to the write buffers 104 is transmitted synchronous to and in parallel with the global clock signal. The write data and the global clock signal have substantially the same propagation characteristics and maintain a substantially constant phase relationship while propagating from the master device 84 to the write buffers 104 because the global clock signal lines are substantially parallel to the global data bus signal lines.

The global clock source 280 is physically positioned at an end of the global clock signal line near the last read buffer 106-k. The global clock signal from the clock source 280 is supplied to a transmit clock (TxClk) input of the read. buffers 106, to a receive clock input (RxClk) of the write buffers 104 and to a transmit-receive clock (TxRxClk) input of the master device 84.

In the master device 84, a phase-locked loop (PLL) or a delay-locked loop (DLL) senses the global clock signal which is received at the transmit-receive clock (TxRxClk) pin 284. The PLL or DLL uses the global clock signal to generate internal clock signals that are used for transmitting data to and receiving data from the global bus 82. The write buffers 104 and read buffers 106 also have PLLs or DLLs to sense the global clock signal and to generate their own internal clock signals, which will be described below.

In the memory subsystems 86, each write buffer 104 provides a local clock signal on one or more local clock signal lines 288 that are substantially parallel to the local data bus 100 at the transmit clock (TxClk) pin 286. Local write data transmitted by the write buffer 104 travels on the local signal lines 100 synchronously and in parallel with the local clock signal on the one or more clock signal lines 288. Because the local clock signal lines 288 and the local data signal lines 100 are substantially parallel, the local write data and the local clock signals have substantially the same propagation characteristics and maintain substantially the same fixed phase relationship as they propagate down their respective signal lines, passing the memory devices 102, to the read buffer 106.

The memory devices 102 transmit read data onto the local data bus 100 synchronous with the local clock signal. Local read data transmitted by a memory device 102 travels on the local data bus in parallel with the local clock signal. The local read data and the local clock signals have substantially the same propagation characteristics and maintain substantially the same constant phase relationship as they propagate down their respective signal lines, passing memory devices 102, if any, to the read buffer 106. In one embodiment, the frequency of the local clock signal is less than the frequency of the global clock signal. Alternately, the frequency of the local clock signal is equal to the frequency of the global clock.

To prevent unwanted reflections, the global clock signal line 282 is connected to a terminator 292 at an opposite end from that of the clock source 280. The terminator 292 is a passive terminator matched to the terminators of the global bus 92-1b. Although the clocking configuration was described with respect to the expandable memory system 80 of FIG. 5. The clocking configuration is also used in the expandable memory system 250 of FIG. 11.

A Write Buffer

Figure 13:
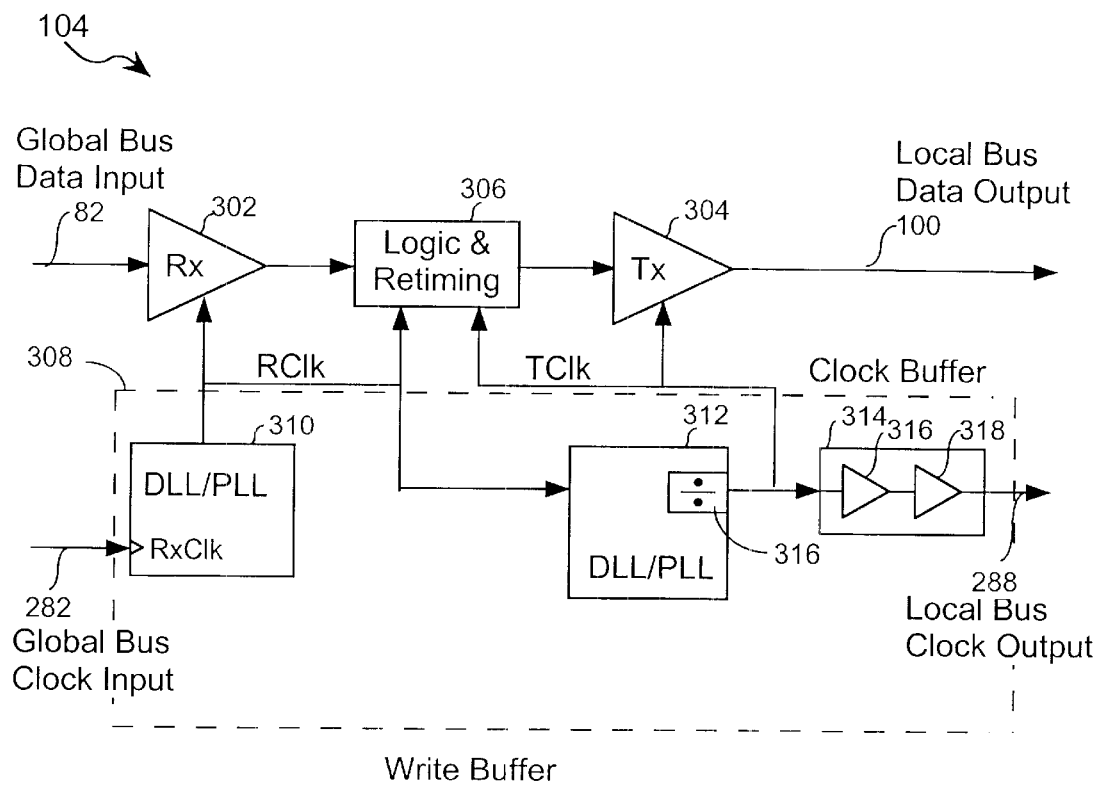
FIG. 13 is a detailed block diagram of a write buffer.

In FIG. 13, an exemplary write buffer 104 is shown. The write buffer 104 is a transceiver circuit that buffers write data between the global bus 82 and the local bus 100. Each write buffer 104 includes one or more receiver circuits (Rx) 302 for receiving the write data signals from the global bus 82, and one or more transmitter (Tx) or drive circuits 304 for retransmitting the data onto the local signal lines 100 of the local bus. Because the signaling of the global bus may be different from the signaling of the local bus, and because the global and local busses may operate at different frequencies or data rates, a write logic and retiming circuit 306 is placed in series with and between the receiver 302 and the transmitter 304. The write logic and retiming circuit 306 converts the write data from the global bus 82 into a predefined transmission format used by the local bus 100. In one embodiment, write data is transmitted on the global bus 82 using multi-level symbols such as quadrature-amplitude-modulation (QAM) symbols having two bits per symbol at a frequency f. U.S. patent application Ser. No. 09/478,916, to Zerbe et al., titled "Low Latency Multi-level Communication Interface," filed on Jan. 6, 2000 is hereby incorporated by reference in its entirety as background information on multi-level symbols. On the local bus, the write data is transmitted using binary symbols having one bit per symbol at one-fourth of the frequency of the global bus (i.e., f/4). The write logic and retiming block 306 decodes the QAM symbols into a binary bit stream, and retimes and buffers the binary bit stream for transmission onto the local bus at the slower clock rate. The write logic and retiming circuit 306 also controls the passing of the data across internal write-buffer receive clock (RClk)—write-buffer transmit clock (TClk) clock domains, which will be further described below. In an alternate embodiment, when the. global and local signaling and clock frequencies are the same, the write logic and retiming circuit 306 is not used and the output of the receiver 302 is connected to the transmitter 304.

The write buffer 104 also includes a timing and synchronization block 308 to properly receive and retransmit the write data from the global bus 82 to the local bus 100. A first write DLL/PLL block 310 generates the receive clock signal, RClk, from the global clock signal. The relationship between the phase of the receive clock signal RClk and the global clock is predefined. In one embodiment, the first write DLL/PLL block 310 is a phase-locked loop. Alternately, the first write DLL/PLL block 310 is a delay-locked loop. The receiver 302 is clocked by the internal receive clock signal, RClk. The receive clock signal, RClk, is also supplied to a second write DLL/PLL block 312 which produces an output clock signal (TClk) that passes through a clock buffer 314 and serves as the clock signal for the local bus 100. The second write DLL/PLL block 312 synchronizes and aligns the timing of the output data of the write buffer with the local clock. In one embodiment, the second write DLL/PLL 312 block is a phase-locked loop. Alternately, the second write DLL/PLL block 312 is a delay-locked loop. In another alternate embodiment, the second write DLL/PLL block 312 includes a divider 316 to derive the desired local clock frequency from the internal receive clock RClk.

The local transmit clock (TClk) also synchronizes the data signals transmitted to the local bus. The clock buffer 314 drives the local clock signal. The phase of the local transmit clock TClk with respect to the local write data signals is predefined. In another alternate embodiment that has the same global and local signaling and clock frequencies, the second DLL/PLL 312 is not used because the receive clock and transmit clock are the same, and the receive clock signal from first DLL/PLL 310 is supplied directly to the clock buffer 314 and transmitter 304.

The clock buffer 314 includes two inverters, 316 and 318, connected in series to drive the local clock signal on a local clock signal line 288.

The global bus transports the control information, including addressing in a control packet, to the write buffer 104. The write buffer 104 detects the control packet on the global bs, decodes a specific module address field, and processes the control packet if the address field matches a module or subsystem identifier. A register in the write buffer 104 stores the subsystem identifier.

A Read Buffer

Figure 14:
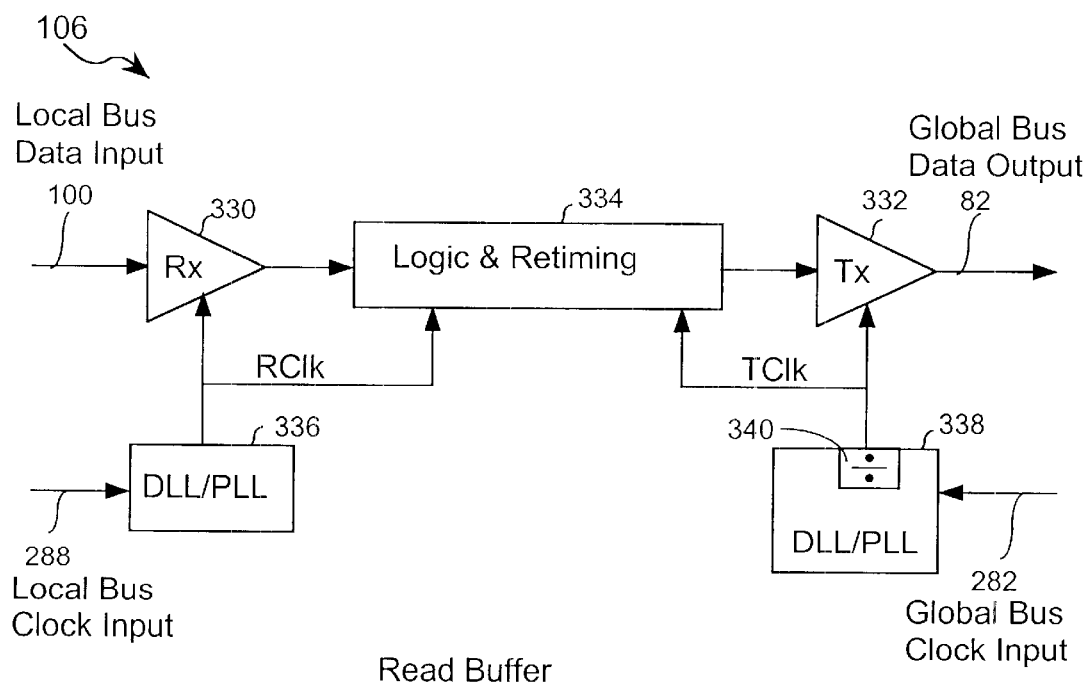
FIG. 14 is a detailed block diagram of a read buffer.

In FIG. 14, an exemplary read buffer 106 is shown. The read buffer 106 is a transceiver circuit like the write buffer 104, except that the read buffer 106 buffers read data from the local signal lines of the local bus and the global bus 82. In addition, the timing functions of the read buffer 106 are different from the timing functions of the write buffer 104.

For each local signal line 100 transporting data, the read buffer 106 includes a receiver circuit (Rx) 330 that receives the local data signal from the local bus signal line 100, and a transmitter circuit (Tx) 332 for retransmitting the data signal onto a global bus data signal line 82 of the global bus. Because the signaling on the global bus may be different from the signaling on the local bus, and because the global and local busses may operate at different frequencies or data rates, a read logic and retiming circuit 334 is placed in series with and between the receiver 330 and the transmitter 332. The read logic and retiming circuit 334 converts the read data from the local bus 100 into a predefined transmission format used by the global bus 82.

The phase of the global clock received by the read buffer 106 may not be synchronized to the phase of the internal read buffer receive clock (RClk). The read logic and retiming circuit 334 synchronizes the timing of the data with respect to the global clock and the internal read buffer receive clock (RClk) to accommodate the phase difference and difference in frequency, if any. The phase relationship between the timing of the data signals on the local bus 100 and global bus 82 depends on the physical location of the local channel of that memory subsystem along the global bus 82.

To derive the internal read clock signal (RClk), the read buffer 106 uses a first read DLL/PLL block 336. The first read DLL/PLL block 336 is the same as the first write DLL/PLL block 31:0 of FIG. 13 and will not be further described. A second read DLL/PLL block 338 receives the global clock signal from the global clock signal line 282 at a transmit clock input (TxClk). The second read DLL/PLL block 338 generates an internal read-transmit clock (TClk) which is supplied to the read logic and retiming circuit 334 and the transmitter 332.

In one embodiment, each read buffer 106 is levelized with respect to the global bus. For instance, each read buffer is programmed to transmit data at different delay values, depending on the position of the read buffer 106 on the global bus. The delay values are selected to reduce the likelihood of read/write bubbles. In other words, each read buffer 106 is configured to receive data from the local bus a predefined number of cycles after receiving a control packet. Each read buffer 106 is also configured to delay transmitting the data on to the local bus for another predefined number of cycles.

Memory Device Timing in a Memory Subsystem

One feature of at least some embodiments of the expandable memory system of the present invention is the ability to use the same memory devices as the prior art memory system 50 of FIG. 1. The prior art memory devices 42 have two clock inputs—a receive clock (RxClk) input for a receive clock, and a transmit clock (TxClk) input for a transmit clock.

Figure 15A:
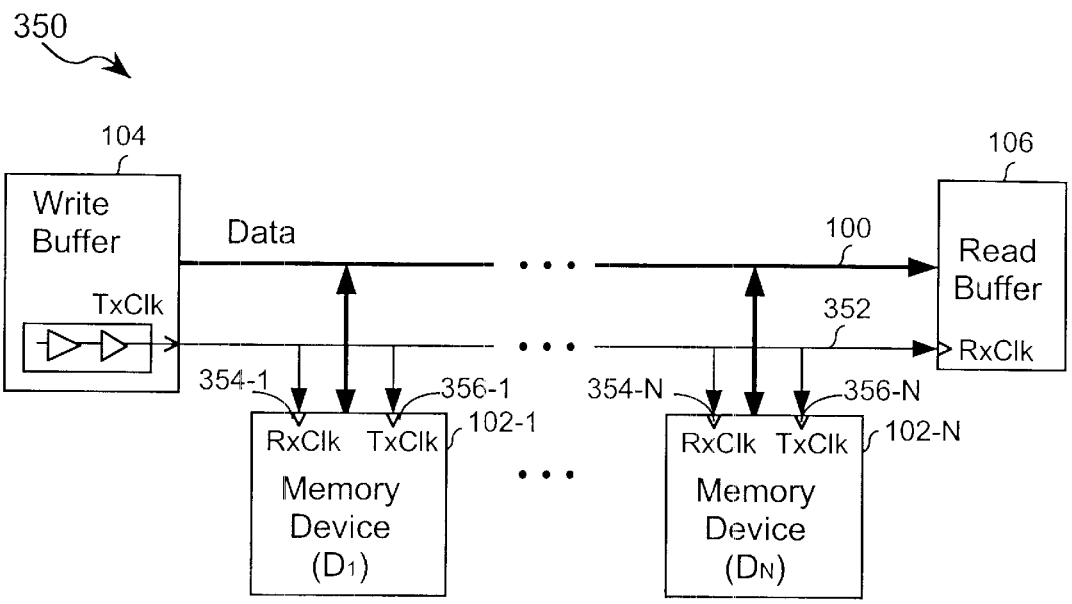
FIG. 15A is a block diagram of a local clock signal line in a memory subsystem.

FIG. 15A is a block diagram of another exemplary memory subsystem 350 that illustrates an embodiment for supplying the local clock signal to the memory devices 102. In FIG. 15A, a single local clock signal is supplied on a local clock signal line 352 from the write buffer 104 to synchronize the timing of all the data signal lines of the local bus 100. The local clock signal line 352 connects to both the receive clock input pin 354 and to the transmit clock input pin 356 of each memory device 102 in the memory subsystem 350. However, this memory subsystem 350 may not work at a high speed. Because the local clock signal line connects to two input pins on each memory device 102, the local clock signal line 352 has twice the capacitance of the data signal lines 100. Therefore the propagation time of the local clock signal and the data signals will not match and be skewed. The skew between the local clock signal and the data signals increases the probability of errors in the data received at the memory devices 102 and the read buffer 106.

Figure 15B:
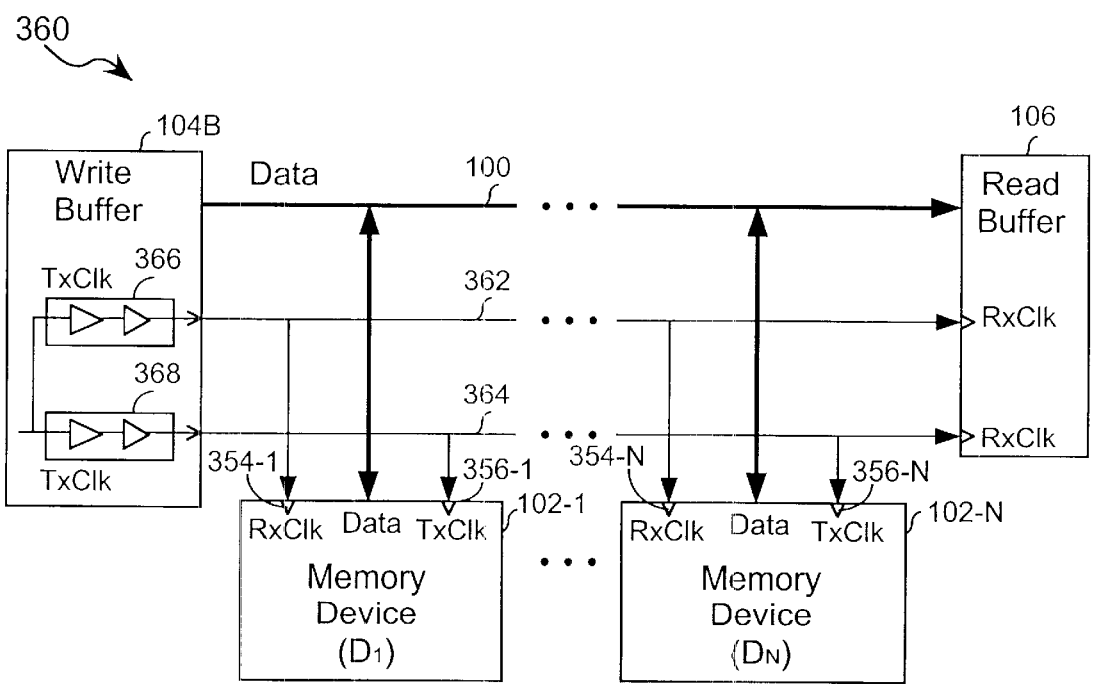
FIG. 15B is a block diagram of an alternate embodiment of local clock signal lines in a memory subsystem.

FIG. 15B is an alternate embodiment of a memory subsystem 360 that overcomes the capacitance problem of the memory subsystem 350 of FIG. 15A. In the memory system 360, two substantially identical, parallel local clock signal lines 362 and 364 are parallel to the data signal lines 100 of the local data bus. The write buffer 104B generates and supplies a local transmit clock to separate, substantially identical buffers, 366 and 368, which supply the local transmit clock to each clock signal line 362 and 364, respectively. One clock signal line 362 supplies the clock signal to the receive clock (RxClk) input pin 354 of the memory devices 102. The other clock signal line 364 supplies the clock signal to the transmit clock (TxClk) input pin 356 of the memory devices 102. Memory subsystem 360 works with the prior art memory devices of FIG. 1. However, memory subsystem 360 consumes additional power and board space because an additional clock line and clock signal are provided.

Figure 15C:
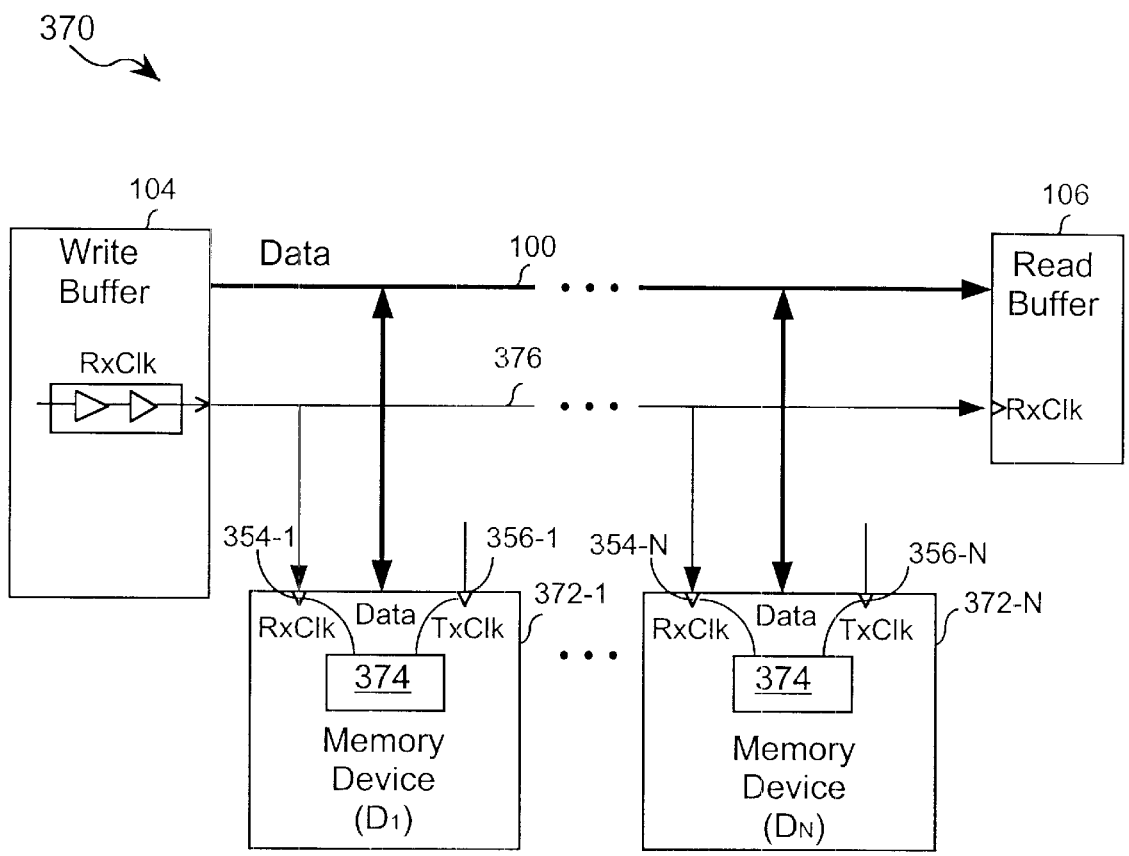
FIG. 15C is a block diagram of another alternate embodiment of a local clock signal line in a memory subsystem.

FIG. 15C is another alternate embodiment of a memory subsystem 370 that overcomes the problems of the memory subsystems of FIGS. 15A and 15B. In this memory subsystem 370, the memory devices 372 are different from the prior art memory devices 42 of FIG. 1. The memory devices 372 include a clock selection circuit 374 which allows the memory devices 372 to operate like the memory devices of FIG. 1 with two clock inputs, or to operate with a single clock input. The clock selection circuit 374 will be further described with respect to FIG. 16.

The memory subsystem 370 of FIG. 15C is like the memory subsystem 350 of FIG. 15A except that the transmit clock (TxClk) input pin 356 is open and not connected to a local clock signal line 376. Therefore, the capacitance of the local clock signal line 376 is substantially the same as the capacitance of the data signal lines 100.

Figure 16:
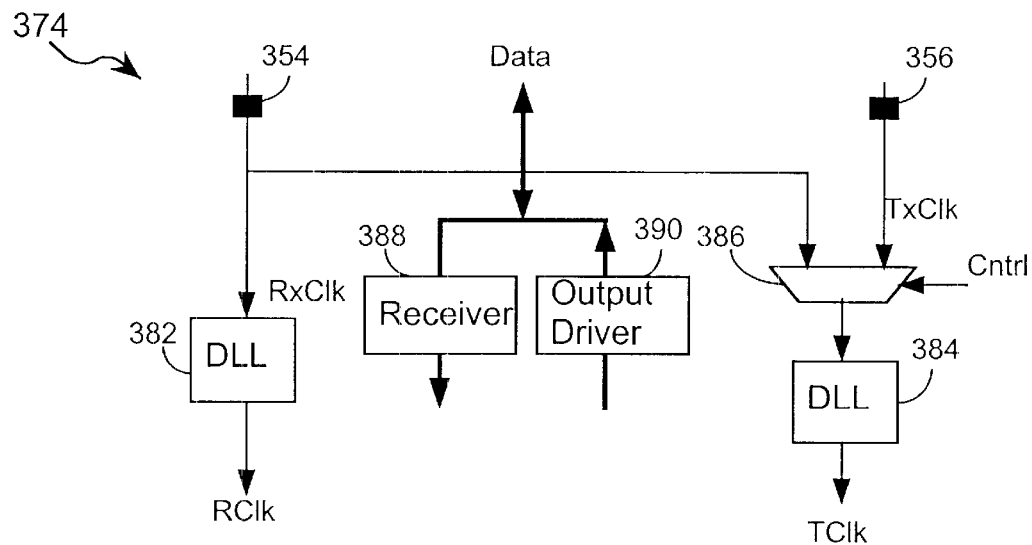
FIG. 16 is a block diagram of a clock selection circuit used in a memory device of the memory subsystem of FIG. 15C.

Although FIGS. 15A, 15B and 15C have been described with respect to a single-ended clock signal, in an alternate embodiment, a differential clock signal is used. Referring to FIG. 16, a circuit diagram of the clock selection circuit 374 is shown. As in prior art memory devices, each memory device has a first DLL 382 that generates an internal receive clock (RClk) from the receive clock signal at the receive clock input pin 354. Each memory device also has a second DLL 384 that supplies an internal transmit clock (TClk). In the modified memory device 372 of the present invention, a multiplexor 386 is added at the transmit clock. When the memory device 372 is working in a prior art system such as shown in FIG. 1, in response to the clock control signal (Cntrl), the multiplexor 386 supplies the external transmit clock signal from the transmit clock input pin 356 to the second DLL 384. When operating in the memory subsystem of FIG. 15C, in response to the clock control signal, the multiplexor 386 supplies the external receive clock signal from the receive clock input pin 354 to the second DLL 384.

FIG. 16 also illustrates that, in all the memories, the receiver clock (RClk) is coupled to the receiver 388 to synchronize the reception of incoming data. The transmit clock (TClk) is coupled to the output driver 390 to synchronize the transmission of outgoing data.

Although the memory subsystem 370 of FIG. 15C uses a modified memory device 372, the modification allows the memory devices 372 to operate in both a prior art system and the memory systems of the present invention. In addition, the memory subsystem 370 of FIG. 15C consumes less power and board space than the memory subsystems of FIGS. 15A and 15B.

In an alternate embodiment, the multiplexor 386 is added at the receive clock by supplying the selected signal to the first DLL, rather than the transmit clock. In this embodiment, the receive clock pin 354 is left open when the memory device is installed in the memory system of the present invention.

Control

Figure 17:
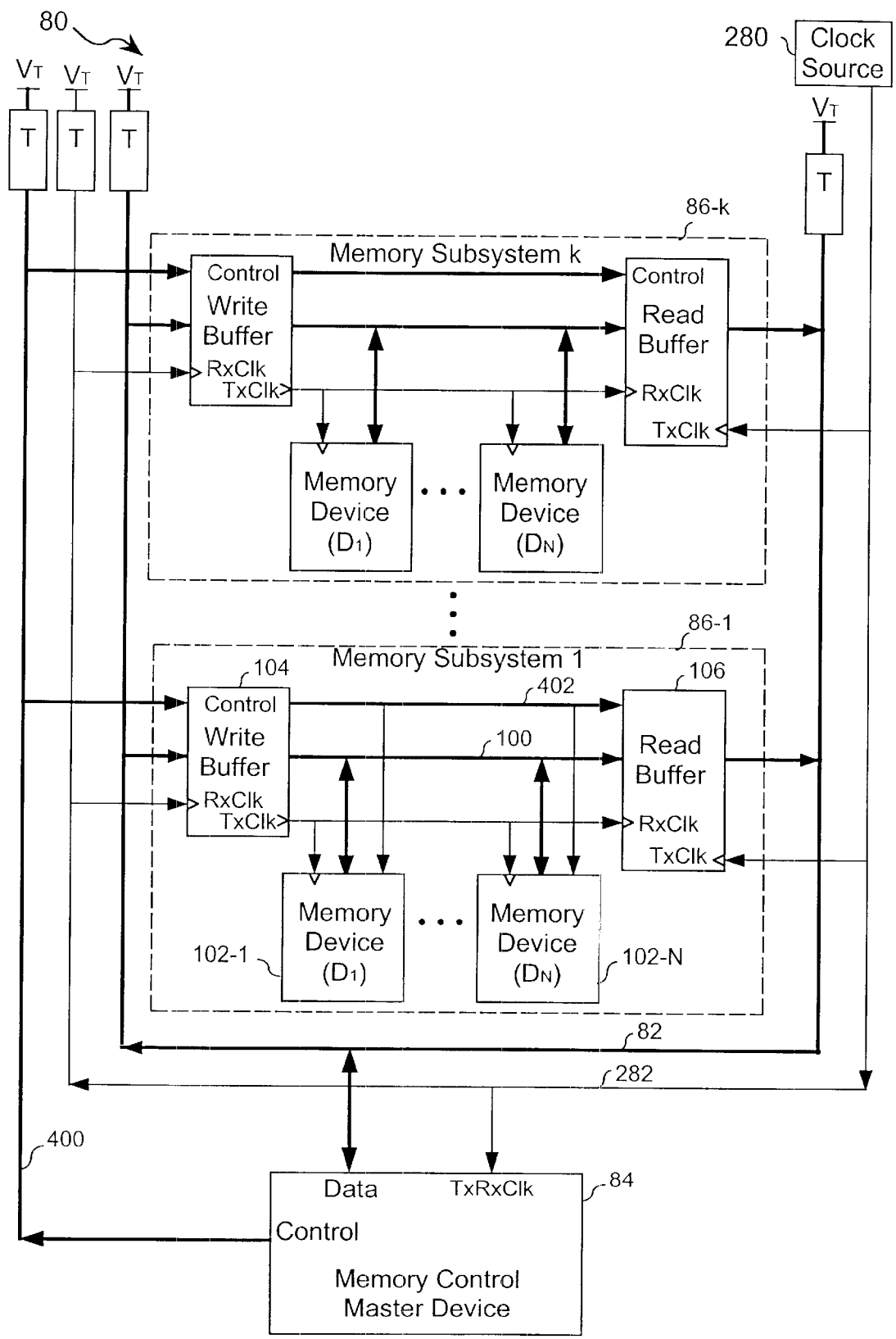
FIG. 17 is a more detailed block diagram of the memory system of FIG. 5 showing a control bus.

FIG. 17 is a more detailed block diagram of a global control bus 400 of the memory system 80 of FIGS. 5 and 12. The global control bus 400 connects the master device 84 to the write buffers 104. In each memory system 86, a local control bus 402 connects the write buffers to the memory devices 102 and the read buffer 106. The global control bus 400 includes global control bus signal lines, and the local control bus 402 includes local control bus signal lines. The global control bus 400 and the local control bus 402 are unidirectional busses as shown by the arrows. The circuit of FIG. 13 can be used to provide an interface between the global control bus and the local control bus. Control signals travel from the master device 84 to the write buffers 104, then onto the memory devices 102 and the read buffer 106. The control busses transmit several types of control information including write requests, read requests, address information and mode information such as placing the memory devices 102 in "sleep" mode.

In the present invention, the control busses 400 and 402 also control the active terminators. The active terminators are activated and deactivated for each bit. The global control bus 400 is parallel to the portion of the global data bus between the master device 84 and the write buffers 108. Like the global unidirectional data bus 82, the signal lines of the global control bus 400 are also terminated with a passive terminator 404. Therefore, the propagation characteristics of the global control bus 400 are substantially the same as the propagation characteristics of the global data bus 82; and control signals are transmitted simultaneously with each bit to activate and deactivate an active terminator. Alternately, depending on the embodiment, the write buffer 104 and read buffer 106 include additional logic that generates the control signals to activate and deactivate their respective active terminators by deriving the active terminator control signals from control information such as read and write request packets.

Alternately, the active terminators are activated and deactivated for each symbol.

Levelization

Figure 18:
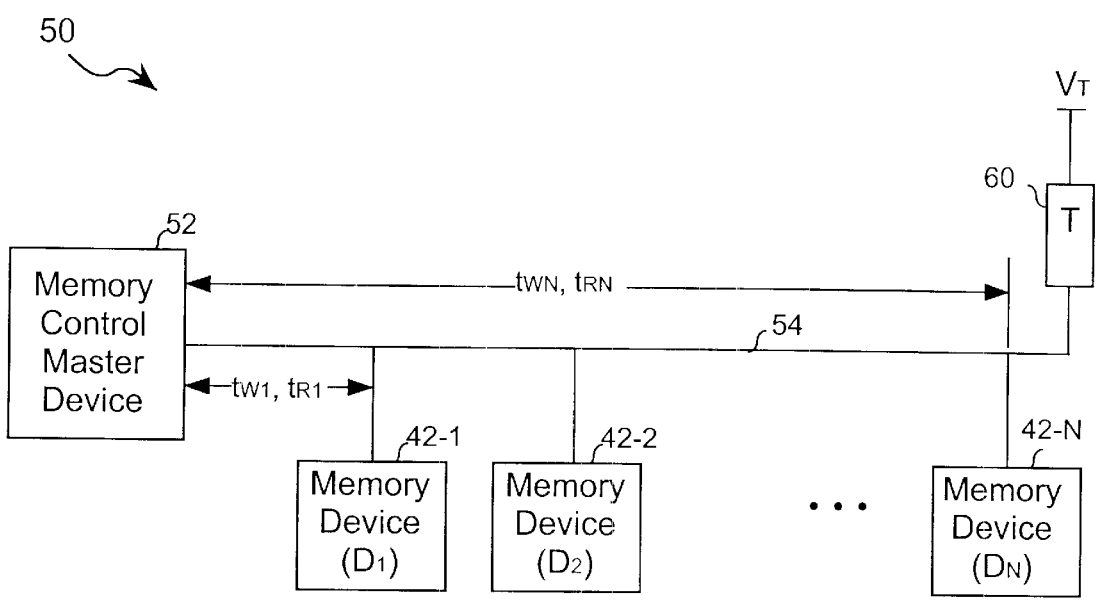
FIG. 18 is a block diagram of the prior art bidirectional bus of FIG. 1 in further detail.

In prior art systems, as shown in FIG. 18, a technique called levelization is used to manage the flow of data between the master device and the memory devices. The memory system of the present invention reduces the need for levelization.

FIG. 18 is the same as FIG. 1 except that additional timing parameters are shown. Levelization will be explained by way of the following example. Assume that the master device 52 first writes data into memory device one 42-1 and then reads data from memory device one 42-1. The read and write times are $t_{R1}$ and $t_{W1}$, respectively. When the master device 52 writes data into memory device N 42-N and reads data from memory device N 42-N, the read and write times of the data on the data signal line are $t_{RN}$ and $t_{WN}$, respectively. Because the distance from the master device 52 to memory device one 42-1 is much less than the distance from the master device 52 to memory device N 42-N, the read and write times, $t_{R1}$ and $t_{W1}$, of memory device one 42-1 are much less than the read and write times, $t_{RN}$ and $t_{WN}$, respectively, of memory device N 42-N. The difference in write times is not a problem when writing data. However, the difference in read times can be a problem when reading data because the master device 52 needs to know when data will be arriving from each memory device 42. Depending on which memory device is accessed, read data can arrive any number of clock cycles (x, x+1, or x+2) after a read request. This delay in reading data is referred to as the turnaround time. Managing read and write operations to account for the turnaround time of each memory device 42 can become complex.

To simplify the management of data, the master device 52 uses the levelization technique. Using levelization, the memory devices 42 transmit their data such that data from all memory devices 42 has the same turnaround time, rather than requiring the master device 52 to track the turnaround time for each memory device 42. Levelization requires that the memory devices that are closer to the master device 52 insert additional cycles of delay into their read data stream, such that all turnaround times in the local bus system are substantially the same. Levelization is equivalent to placing all the memory devices 42 at the same "level" or distance from the master device 52. That level is equal to the level of the memory device at the end of the bus. Although levelization solves the turnaround time problem, levelization increases the complexity of the memory devices 42. Levelization also forces all the memory devices to have the same maximum turnaround time and, therefore, maximum latency.

A benefit of the memory system of the present invention is that it removes the need for levelization in the local buses of the memory subsystems. Since both read and write data travel in the same direction from the write buffer to the memory device to the read buffer, the turnaround time is equal for all memory devices. Therefore, the memory device complexity and latency is reduced.

However, the memory system of the present invention does apply some levelization. Since the master device needs to know when to expect read data from the read buffers, the read buffers are levelized. However, the memory system of the present invention is expected to have fewer read buffers than memory devices. In one embodiment, the read buffers are fabricated using a more advanced higher performance process than the memory devices. Therefore, implementing levelization in the read buffers of the present invention is less complex than in the prior art system.

Bus Utilization Analysis: a Prior Art Bidirectional Bus

Figure 19A:
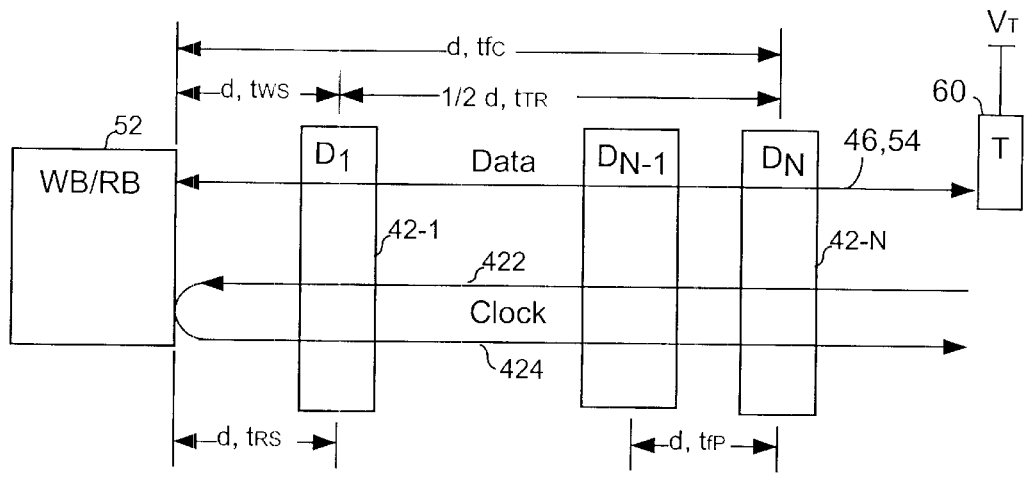
FIG. 19A is a block diagram of the prior art bidirectional memory system of FIG. 1 showing additional details.

This section examines the physical limitations to bus utilization in the prior art bidirectional bus 54 of FIG. 19A. The prior art bidirectional bus 54 of FIG. 19A is the same as the prior art bidirectional bus 54 of FIG. 1. FIG. 19A overlays the memory devices over the data bus 54 and shows additional timing parameters and the clock signal. The following analysis is based on the following physical constraints.

1. Receiver constraint: The receiver in the addressed memory device receives a single, full swing data signal at its I/O pins to reliably receive the transmitted data. No other data or miscellaneous signal energy may be superimposed on the desired data at the point of reception.
2. Transmitter constraint: Drive circuits in the slave devices can transmit valid data signals (i.e., maintain a sufficient output impedance) when there exists at most $V_{SWING}$ of any other signal at its I/O pins.
3. Terminator constraint: Unswitched or passive terminators absorb all signals at all times. Switched active terminators absorb all signals when active, reflect all signals when inactive, and corrupt all signals when switching between the active and inactive states. A non-zero time, $t_{SW}$, is the time to switch the switched active terminator between the active and inactive states.

Referring now to FIG. 19A, the master device 52 has a write buffer and a read buffer (WB/RB) 420. Each signal line of the bus 54 is terminated by an unswitched terminator 60 and the memory devices 42 are connected to the bus 54. The clock lines 422, 424 show the direction of the clock signals. The following analysis assumes that all signals, clock and data, travel with equal velocity, vp, down the bus signal lines 54. The physical distances and flight or propagation times are directly proportional to each other in accordance with relationship ten as follows:

$$D = v_p * t \quad (10)$$

In the following description, the term "channel" may at times be used rather than "signal line." A channel is the same as a signal line. Also the term "slave device" is broader than and includes a memory device. The labeled distances and flight times shown in FIG. 19A are defined below:

d, $t_{fC}$: Channel Flight Distance (d) and Time ($t_{fC}$)—the distance and time from the write buffer 52 to the farthest memory device 42-N on the channel 54, respectively.

d, $t_{TR}$: Channel Turnaround Distance (d) and Time ($t_{tR}$)—the distance and time from the first memory device 42-1 to the last memory device 42-N on the channel.

d, $t_{WS}$: Write Buffer to Slave Device Distance (d) and Time ($t_{WS}$)—the distance and time from the write buffer 52 to the closest memory device 42-1 on the channel.

d, $t_{RS}$: Read Buffer to Slave Device Distance (d) and Time ($t_{RS}$)—the distance and time from the read buffer 52 to the closest memory device 42-1 on the channel.

d, $t_{fP}$: Adjacent Slave Device Flight Distance (d) and Time ($t_{fP}$)—the distance and time between adjacent memory devices on the channel.

In this system, the write buffer to slave device time $t_{WS}$ is equal to the read buffer to slave device time $t_{RS}$. Because the distances and times are related as in relationship eleven above, the distances and times will be referred to as times, for example, $t_{WS}$ rather than d, $t_{WS}$.

Figure 19B:
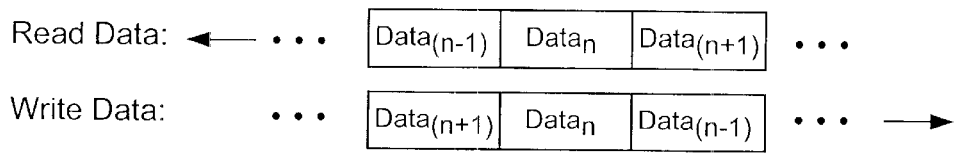
FIG. 19B illustrates data traveling down the data bus of FIG. 19A in data slots.

FIG. 19B illustrates data traveling down the data bus 54 of FIG. 19A. The data is sent in "data slots" represented by boxes that travel across the data bus synchronized with the clock signal. Depending on the embodiment, the boxes of data may represent data bits, data symbols or data packets. A data packet has one or more data bits or symbols. Read data propagates from right to left while write data propagates from left to right. Since the channel 54 presents an open circuit condition at the master device that reflects all incident signals, all "data slots" are also reflect at the master device. Therefore, the data slots emerge at the right end of the channel, travel past all the memory devices 42 toward the master device 52, reflect at the master device, and then travel in the opposite direction past all the memory devices 42 back to the right end of the signal line where they are absorbed by the unswitched passive terminator 60.

Bus utilization efficiency is the ratio of used data slots to total data slots. Bus utilization efficiency is measured by the fraction of data slots that are used at the read buffer (RB). If either read or write data occupies a data slot at the read buffer, that data slot is considered to be used. If either no data or corrupted data occupy a data slot at the read buffer, that data slot is considered unused and wasted. In a binary system, two or more superimposed signals will appear as corrupted data in a data slot. The bus utilization will be analyzed for different read/write conditions:

Case 1: Continuous writes: The system of FIG. 19A achieves 100% bus utilization when performing continuous writes. A continuous write is the transmission of write data in consecutive data slots to any one or a combination of memory devices 42. If no memory devices are transmitting data, the data slots travel across the memory devices 42 from right to left, arriving empty at the master device 52. The write buffer (WB) in the master device 52 can, therefore, transmit write data into every data slot as it reflects back down the channel. The write data then travels down the channel from left to right, passing all the memory devices 42, enabling any or all memory devices 42 to receive the write data. Since all data slots are used, the bus utilization is equal to 100%.

Case 2: Writes Directly Following Reads: The system of FIG. 19A also achieves 100% bus utilization when transmitting write data immediately after read data. Consider a data slot occupied by read data that travels right to left down the bus to the read buffer in the master device 52. As soon as the data slot reflects at the master device 52, the write buffer can write data into the next data slot. The write data then travels down the signal line from left to right past all the memory devices 42, enabling any or all memory devices 42 to receive the write data. Since there are no required, wasted data slots between a data slot with read data and a succeeding data slot with write data, the bus utilization is equal to 100% for writes following reads.

Case 3: Reads Directly Following Writes: The system of FIG. 19A does not achieve 100% bus utilization when transmitting read data immediately after write data. In other words, some wasted data slots at the master device 52 are sometimes required between the write and read data.

To understand the reduced bus utilization and derive a rule consider the following. Assume that data slots, or packets have a duration of $t_{Pkt}$. Assume also that packets are made up of one or more (m) bits, each bit of duration $t_{Bit}$, such that $t_{Pkt} = m * t_{Bit}$, where m is a positive integer. Also assume that $t_{Bit}$ is equal to $\alpha * t_{fP}$, where a is a positive real number such that $t_{Pkt}$ is equal to $\alpha * m * t_{fP}$. Now consider the case where a read packet arrives at the read buffer at time t=0.

Figure 20:
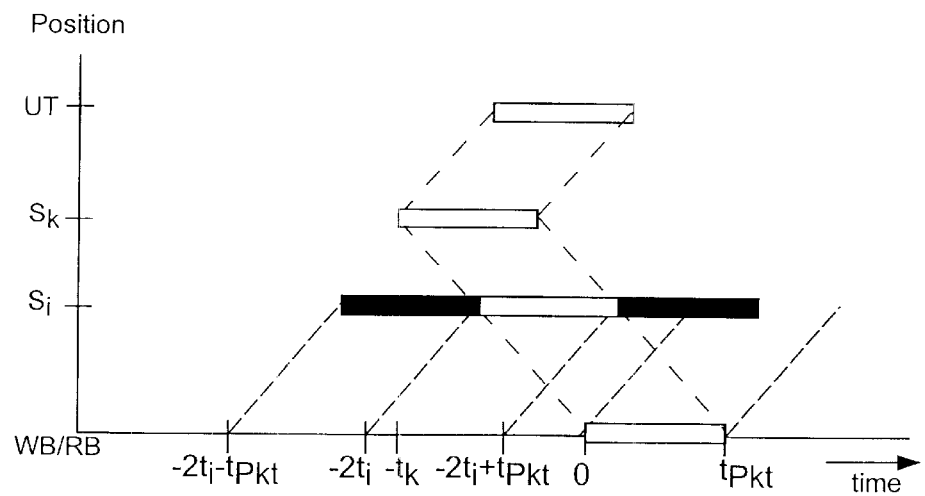
FIG. 20 is a bounce diagram of the memory system of FIG. 19A.

FIG. 20 is a bounce diagram of the system of FIG. 19A. The diagram plots position on the channel (y-axis) as a function of time (x-axis). The zero position of the y-axis is the write buffer and read buffer (WB/RB) of the master device 52. The position of the passive terminator (UT) 60 is also shown on the y-axis. The position of the memory devices (Dk and Di) is shown between the write buffer/read buffer (WB/RB) and the unswitched terminator (UT) at the end of the bus. FIG. 20 will be used for determining the valid time, prior to t=0, for transmitting a write packet at the write buffer 52. The white rectangles represent read data packets that are transmitted at the kth memory device, which is at a distance $d_k$ from the master device 52 where k is an integer as defined by the following relationship:

$$d_k = [((k-1) * d_{fP}) + d_{RS}] \quad (11)$$

Signals transmitted by the kth memory device take a corresponding amount of time $t_k$ to reach the write buffer 52 as defined by the following relationship:

$$t_k = [((k-1) * t_{fP}) + t_{RS}] \quad (12)$$

Therefore, assuming that the beginning of the read packet reaches the write buffer/read buffer (WB/RB) of the master device 52 at t=0, memory device Dk transmits the packet during the time interval $-t_k$ to $(-t_k + t_{Pkt})$. Since all packets have the same length, the transmission time of a packet is defined as the time at which its transmission commences from the memory device. For example, the transmission time, $t_{t\_r}$ of the read packet from memory device Dk is equal to $-t_k$.

Now assume that a write data packet is to be written to the ith memory device Di. A write data packet is shown as a shaded rectangle. To satisfy the receiver constraint at the ith memory device Di, no portion of the write packet may overlap any part of the read packet at the master device 52. Therefore, the first constraint is that the write packet should be sent prior to time $-t_{Pkt}$, i.e., $t_{t\_w} \leq -t_{Pkt}$.

For the second constraint, the memory device Di is at a distance di from the master device 52, where i is an integer in accordance with relationship thirteen as follows:

$$d_i = [((i-1)*d_{fP}) + d_{RS}] \quad (13)$$

Write signals transmitted by the master device 52 take a corresponding time ti to reach memory device Di in accordance with relationship fourteen as follows:

$$t_i = [((i-1)*t_{fP}) + t_{RS}]. \quad (14)$$

To satisfy the receiver constraint at the ith memory device Di, no part of the read packet traveling towards the master device 52 may intersect the write packet at Di. Therefore, assuming that $k \geq i$ and applying geometry to FIG. 20, the following relationship defines the allowable times for transmitting the write packet:

$$t_{t-w} \leq -2t_i - t_{Pkt} \text{ or } t_{t-w} \geq -2t_i + t_{Pkt}. \quad (15)$$

When $k \leq i$, the allowable times for transmitting the write packet are as follows:

$$t_{t-w} \leq -2t_k - t_{Pkt} \text{ or } t_{t-w} \geq -2t_k + t_{Pkt}. \quad (16)$$

Combining the constraints provides the following overall rules that define valid times for transmitting a write packet before a read packet arrives in accordance with relationship seventeen as follows:

$$t_{t-w} \leq \text{Max}(-2t_k - t_{Pkt}, -2t_i - t_{Pkt}) \text{ or } \text{Max}(-2t_k + t_{Pkt}, -2t_i + t_{Pkt}) \leq t_{t-w} \leq t_{Pkt}. \quad (17)$$

Since the master device 52 is initially responsible for issuing read requests and, therefore, knows when to expect read data to arrive at the read buffer, the master device 52 uses these relationships to generate a table of valid write times for each memory device 42. If write data is transmitted to a memory device before a read packet arrives, the master device 52 checks the table to ensure that the write packet is transmitted at a valid time. If the valid times have passed, then the write buffer 52 waits until the read packet has reflected from the master device 52, (i.e., waits for a duration t equal to $t_{Pkt}$) to transmit the write packet. In systems in which performing these computations and scheduling is impractical, the rule of relationship eighteen can be applied:

$$t_{t-w} \leq (-2t_{fC} - t_{Pkt}) = (-2t_N - t_{Pkt}). \quad (18)$$

Although implementing the rule of relationship eighteen degrades bus utilization efficiency, this rule is easy to apply and guarantees valid transmission of reads following writes under all cases.

Figure 21:
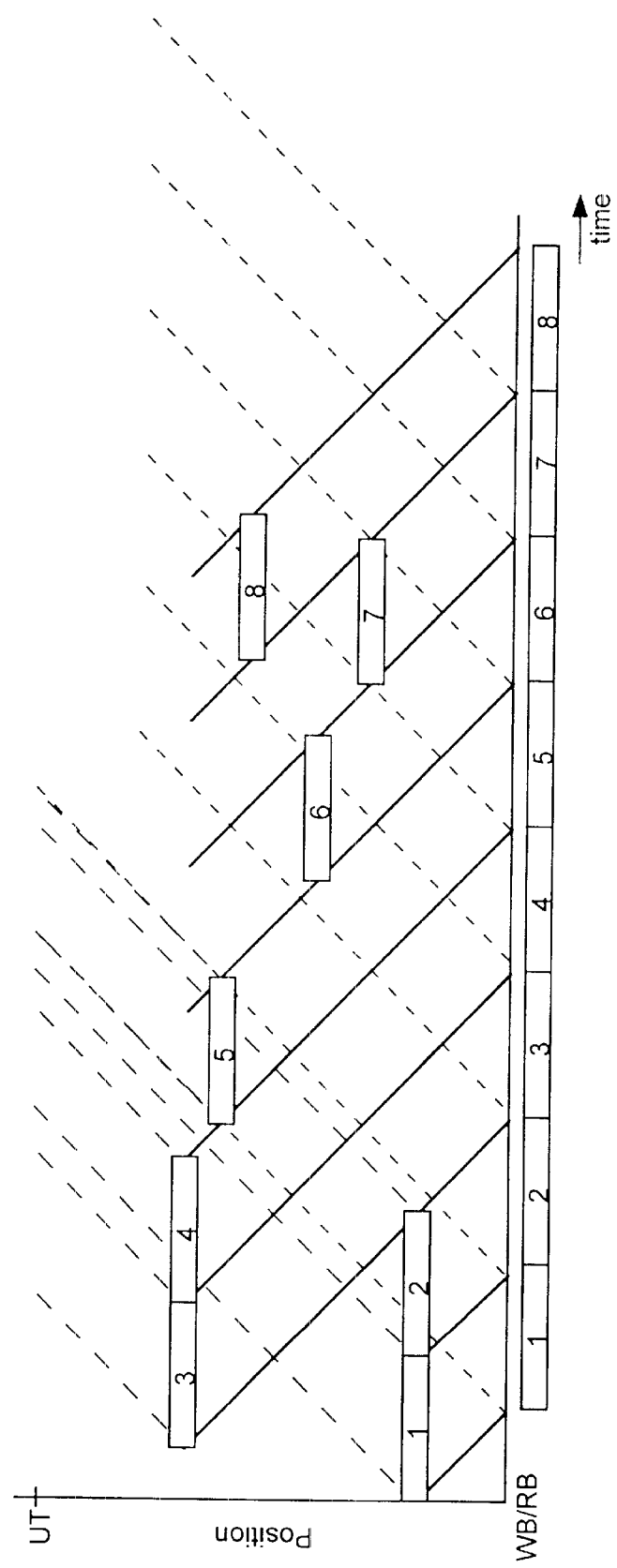
FIG. 21 is bounce diagram illustrating 100% utilization of data slots when performing continuous reads.

Case 4: Continuous Reads: A continuous read is the transmission of read data in consecutive data slots by one or a combination of memory devices 42 to the master device. As shown in FIG. 21, 100% bus utilization is possible for continuous reads as long as each slave device transmits read data into unused data slots such that all data slots are used when they arrive at the read buffer. The white rectangles indicate when and where a read packet is generated. The packets are numbered for easy reference. The solid lines indicate the paths of the useful incident read packets (i.e., the incident read packet that travels towards the read buffer).

The shorter dashed lines indicate the paths of the reflected read packets, and the longer dashed lines indicate the paths of the wasted incident read packets. That is, a wasted incident read packet is that read packet that travels toward the unswitched terminator 60. The row of consecutive data slots below the x-axis shows that all data slots at the master device are populated with read packets. No memory device transmits over more than $V_{SWING}$ of the other signals. For example, the first two-thirds of read packet #5 transmits over the reflected packet #1 and the wasted incident packet #2. Reflected packet #1 and wasted incident packet #2 each contributes $V_{SWING}/2$ of signal.

In some instances, conditions could allow for more than $V_{SWING}$ of signal to be present at the I/O pins of a memory device, preventing that memory device from transmitting read data during that time. Satisfying this constraint can decrease bus utilization during continuous reads. The constraint for continuous unrestricted back-to-back reads is: $t_{PKT} \geq t_{TR}$. As long as this constraint is satisfied, all back-to-back reads from any of the slave devices in any order are permitted. Therefore, 100% bus utilization for continuous reads can be achieved as long as this constraint is satisfied.

Bus Utilization Analysis: Unidirectional Local Bus: Dual Passive Terminators

The bus utilization for the unidirectional local bus configuration of the memory subsystem 120 of FIG. 6 will now be analyzed. This analysis uses the receiver, transmitter and terminator constraints discussed above with respect to the prior art circuit of FIG. 19A. The only change is to the transmitter constraint. When the read and write buffer are physically separated, as in the unidirectional bus, two conditions are placed on the drive circuits of the write buffer:

The write buffer drive circuit transmits valid data signals even when as much as $V_{SWING}$ of another signal is present at its I/O pins, such a drive circuit will be referred to as a Type A drive circuit.

The write buffer drive circuit cannot transmit valid data signals even when as much as $V_{SWING}$ of another signal is present at its I/O pins, such a drive circuit will be referred to as a Type B drive circuit.

The unidirectional local bus will be analyzed for at least one or both the Type A and Type B drive circuits.

Referring back to FIG. 6, the local bus 122 connects to dual passive terminators 128 and 130. Since both ends of the local bus 122 are properly terminated at all times, both read and write data travel in data slots from left to right without any reflections.

All signals travel with equal velocity vp over the signal lines 122 of the local bus. The definitions of the distances and times for memory subsystem 120 are as follows:

d, $t_{fC}$: Channel Flight Distance (d) and Time ($t_{fC}$)—the distance and time from the write buffer 104 to the read buffer 106.

d, $t_{AD}$: Channel Active Distance (d) and Time ($t_{AD}$)—the distance and time from the first memory device 102-1 to the last memory device 102-N on the channel.

d, $t_{WS}$: Write Buffer to Slave Device Distance (d) and Time ($t_{WS}$)—the distance and time from the write buffer 104 to the closest memory device 102-1 on the channel.

d, $t_{RS}$: Read Buffer to Slave Device Distance (d) and Time ($t_{RS}$)—the distance and time from the read buffer 106 to the closest memory device 102-1 on the channel.

d, $t_{fP}$: Adjacent Slave Device Flight Distance (d) and Time ($t_{fP}$)—the distance and time between adjacent memory devices on the channel.

Case 1: Continuous writes: The memory subsystem 120 of FIG. 6 achieves 100% bus utilization when performing continuous writes, regardless of which memory device 102 receives the data. The write buffer 104 transmits write data into every data slot. The write data then travels left to right from the write buffer 104, past the memory devices 102, to the unswitched terminator at the read buffer 106. Any one or all of the memory devices 102 can receive the write data. Since all data slots are used, the bus utilization is 100%.

Case 2: Writes Directly following reads: The bus utilization of writes following reads depends on the type of drive circuit used in the write buffer.

Using type A drive circuits, 100% bus utilization is achievable. Write data can be transmitted into data slots immediately following data slots which are designated for read data. The write buffer drive circuits are unaffected by the wasted incident read packets from the memory devices that terminate on the unswitched terminator 128 at the write buffer 104.

Using type B drivers, 100% bus utilization may not be achievable. The type B drive circuits in the write buffer 104 cannot drive over the wasted incident read packets from the memory devices 102. Therefore, the write buffer 104 waits for the incident read packets to be absorbed at the unswitched terminator 128 at the write buffer before beginning transmission. This causes some data slots at the read buffer to remain unused, reducing the bus utilization below 100%. Assuming that the ith memory device Di transmits the last read packet at time t=0, the write packet cannot be transmitted until a time equal to t=t=[$t_{Pkt}$+(i−1)*$t_{fP}$+$t_{WS}$] has elapsed, indicating that a read-write bubble of at least [(2i−N−1)*$t_{fP}$+$t_{WS}$+$t_{fC}$] has occurred at the read buffer. In one embodiment, to accommodate the variable delay, the write buffer 104 waits for at least $t_{fC}$ after the end of the transmission of the last read packet (i.e., wait until t=[$t_{Pkt}$+ $t_{fC}$]) before beginning to write to the channel 122.

Case 3: Reads Directly following Writes: The memory subsystem 120 of FIG. 6 achieves 100% bus utilization when reading data immediately after writing data. Memory devices 102 transmit the read data into data slots immediately following the write data that travels down the bus 122 from the write buffer 104 to the read buffer 106.

Case 4: Continuous Reads: Continuous reads are similar to the continuous reads of the bidirectional bus of the prior art circuit of FIG. 19A, except that there are no reflections. There is a problem if a memory device needs to transmit read data over the wasted incident packets of three or more other memory devices.

100% bus utilization can be achieved by adjusting the $t_{Pkt}$ to $t_{AD}$ ratio. In one embodiment, if $t_{Pkt}$ is greater than or equal to $t_{AD}$, and back-to-back continuous reads from any of the memory devices 102 in any order are permitted. Otherwise, bus utilization will be less than 100%.

Bus Utilization Analysis: Unidirectional Local Bus: Passive Terminator at the Write Buffer, Active Terminator in the Read Buffer The bus utilization for the unidirectional local bus configuration of the memory subsystem 140 of FIG. 7 will now be analyzed. The write buffer end of the bus 142 is always properly terminated, while the read buffer end is only terminated when not receiving data packets. When the read buffer 150 expects read data, the active terminator 154 is deactivated so that the read data packets are reflected and doubled in amplitude. While write data travels in data slots from left to right, read data travels in data slots from left to right as well as from right to left. All signals in this memory subsystem, clock and data, travel with equal velocity vp on the signal lines of the bus. The definition of the distances and times are the same as defined for the circuit of FIG. 6.

Case 1: Continuous writes: The memory subsystem 140 of FIG. 7 achieves 100% bus utilization when performing continuous writes. In this case, the active terminator 154 is continuously activated, and the channel 142 operates like the unidirectional channel of FIG. 6, described above.

Case 2: Writes Directly following reads: The bus utilization of writes following reads depends on the type of drive circuit used in the write buffer.

Using type A drive circuits, 100% bus utilization is achievable. Write data can be transmitted into data slots immediately following data slots which are designated for read data. The write buffer drive circuits are not affected by the wasted incident read packets and the reflected read packets from the memory devices that terminate on the unswitched terminator at the write buffer 148.

Using type B drive circuits, 100% bus utilization may not be achievable. The type B drive circuits in the write buffer 148 cannot drive over the wasted incident read packets or the reflected read packets from the memory devices. Also, write packets should not collide with these signals at the memory device for which the write packets are intended. One method to ensure a valid write after a read is to wait until all the energy from a read packet has been absorbed before transmitting a write packet. Using this method, write data cannot be transmitted until the reflection of the read packet is fully absorbed at the write buffer's terminator, referred to as time $t_w$. In one embodiment $t_w$ is defined in accordance with relationship nineteen as follows:

$$t_w = (N-i)*t_{fP}+t_{RS}+t_{fC}+t_{Pkt}. \tag{19}$$

Alternately, for greater simplicity, $t_w$ is a predefined constant such that no calculations are needed, and is defined in accordance with relationship twenty as follows:

$$t_w \geq (N-i)*t_{fP}+t_{RS}+t_{fC}+t_{Pkt}. \tag{20}$$

Both of these methods guarantee proper channel operation, but with decreased bus utilization.

Case 3: Reads directly following writes: The memory subsystem 140 of FIG. 7 achieves nearly 100% bus utilization for read data that immediately follows write data. Memory devices transmit read data into data slots immediately following the last write data. However, a small time delay, $t_{SW}$, may be required between the last write packet and the first read packet to allow the active terminator to switch from its on state to its off state. This time delay $t_{SW}$ limits the bus utilization.

Case 4: Continuous Reads: With respect to the read buffers 150, this channel 142 operates like the prior art bidirectional channel of FIG. 19A. Therefore, the same constraints exist. The memory subsystem 140 achieves 100% bus utilization for continuous reads as long as $t_{Pkt} > 2*t_{AD}$.

Bus Utilization Analysis: Unidirectional Local Bus: Active Terminator in the Write Buffer The bus utilization for the unidirectional local bus configuration of the memory subsystem 200 of FIG. 9 will now be analyzed. The read buffer end of the bus 202 is always properly terminated by passive terminator 206. The write buffer end of the bus 202 is not terminated when transmitting write data packets. When driving write data, the active terminator 204 in the write buffer 210 is inactive so that the drive circuits in the write buffer 210 do not waste half of their energy driving the active terminator 204. This improves the power efficiency of the memory subsystem 200 as compared to the dual, passive terminated channel of the memory subsystem FIG. 6. Both read and write data travel in data slots from left to right. All signals, clock and data, travel with equal velocity vp on the respective signal lines 202. The definition of the distances and times are the same as defined for the circuit of FIG. 6.

Case 1: Continuous writes: Memory subsystem 200 of FIG. 9 achieves 100% bus utilization when performing continuous writes. In this case, the active terminator 154 is continuously deactivated, and all write packets terminate at the read buffer 214.

Case 2: Writes Directly following reads: Memory system 200 of FIG. 9 may not achieve 100% bus utilization. The active terminator 204 at the write buffer 210 is active when any read packet arrives at the write buffer 210 to absorb the energy of the packet. However, to save transmit power, the active terminator 204 is deactivated when the write buffer 219 transmits write packets. Operating the active terminator 204 at the write buffer 210 in this manner prevents subsystem 200 from achieving 100% bus utilization efficiency for writes following reads.

A method to ensure valid writes after reads is to wait until all the energy from the read packet has been absorbed before transmitting the write packet. Write data is not transmitted until the last wasted incident read packet is fully absorbed at the write buffer's terminator 204 and the terminator changes state. This wait time is called $t_w$. In one embodiment $t_w$ is defined in accordance with relationship twenty-one as follows:

$$t_w = (i-1)*t_{fp} + t_{WS} + t_{SW} + t_{Pkt}. \tag{21}$$

Alternately for even greater simplicity, $t_w$ is fixed to a predefined constant in accordance with relationship twenty-two as follows:

$$t_w \geq (N-1)*t_{fp} + t_{WS} + t_{SW} + t_{Pkt}. \tag{22}$$

Defining a wait time $t_w$ using relationships twenty-one and twenty-two guarantees proper memory subsystem 200 operation, but with decreased bus utilization.

Case 3: Reads directly following writes: The memory subsystem 200 of FIG. 9 achieves 100% bus utilization when reading data after writing data. Memory devices 212 transmit the read data into data slots immediately following the last write data. A small time delay between the last write packet and the first read packet that allows the active terminator 204 to switch is inherently provided by the memory system 200 because the last write packet propagates past at least one memory device 212-1 before any read data is transmitted. As long as the time to switch the active terminator $t_{SW}$ is less than or equal to twice $t_{WS}$, 100% bus utilization can be achieved.

Case 4: Continuous reads: With respect to the read buffer 214, the memory subsystem 200 operates like the double, passive terminated unidirectional memory subsystem of FIG. 6 that was described above. Therefore, memory subsystem 200 has the same constraints as the memory subsystem of FIG. 6, and achieves 100% bus utilization for continuous reads as long as $t_{Pkt} \geq t_{AD}$.

Bus Utilization Analysis: Unidirectional Local Bus: Dual Active Terminators

The bus utilization for the unidirectional local bus configuration of the memory subsystem 220 of FIG. 10 will now be analyzed. At the write buffer 228, the active terminator 224 is activated when the write buffer 228 is transmitting write packets so that the drive circuits in the write buffer 228 do not waste half of their energy driving the active terminator 224. The active terminator 224 is activated at all other times. At the read buffer 230, the active terminator 226 is deactivated when the read buffer expects read data. The active terminator 226 is activated all other times. While write data travels in data slots from left to right, read data travels in data slots from left to right as well as from right to left. All signals, clock and data, travel with equal velocity vp down the channel 202. The definition of the distances and times are the same as defined for the circuit of FIG. 6.

Case 1: Continuous writes: The memory subsystem 220 of FIG. 10 achieves 100% bus utilization when performing continuous writes. In this case, the active terminator 224 is continuously deactivated, and all write packets terminate at the read buffer 230.

Case 2: Writes Directly following reads: The combination of requirements on the active terminators 224 and 226 prevent this system from achieving 100% bus utilization efficiency for writes following reads.

A method to ensure valid writes after reads is to wait until all the energy from the read packet has been absorbed before transmitting the write packet. Write data is not transmitted until the last wasted incident read packet is fully absorbed at the write buffer's terminator 204 and the terminator changes state. This wait time is called $t_w$. In one embodiment $t_w$ is defined in accordance with relationship twenty-three as follows:

$$t_w = (i-1)*t_{fp} + t_{RS} + t_{fc} + t_{SW} + t_{Pkt}. \tag{23}$$

Alternately, to further reduce complexity, $t_w$ is fixed to a predefined constant as defined in accordance with relationship twenty-four as follows:

$$t_w \geq (N-1)*t_{fp} + t_{RS} + t_{fc} + t_{SW} + t_{Pkt}. \tag{24}$$

Both of these methods guarantee proper memory subsystem 220 operation, but with decreased bus utilization.

Case 3: Reads directly following writes: The memory subsystem 220 of FIG. 10 achieves nearly 100% bus utilization when reading data immediately after writing data. Ideally, memory devices 232 transmit the read data into data slots immediately following the last write data. However, some delay between the last write packet and the first read packet may be provided to accommodate the switching time $t_{SW}$ of the active terminator 226 in the read buffer 230. Adding this delay will also accommodate the switching time of the active terminator 224 in the write buffer 228 because the last write packet propagates past at least one memory device 232-1 before any read data is transmitted. Memory subsystem 220 achieves nearly 100% bus utilization, limited by the duration of $t_{SW}$.

Case 4: Continuous reads: With respect to the read buffer 230, this memory subsystem 220 operates like the double, passive terminated unidirectional memory subsystem of FIG. 6 that was described above. Therefore, memory subsystem 230 has the same constraints as the memory subsystem of FIG. 6, and achieves 100% bus utilization for continuous reads as long as $t_{Pkt} \geq 2*t_{AD}$.

Expanding the Global Bus

Figure 22:
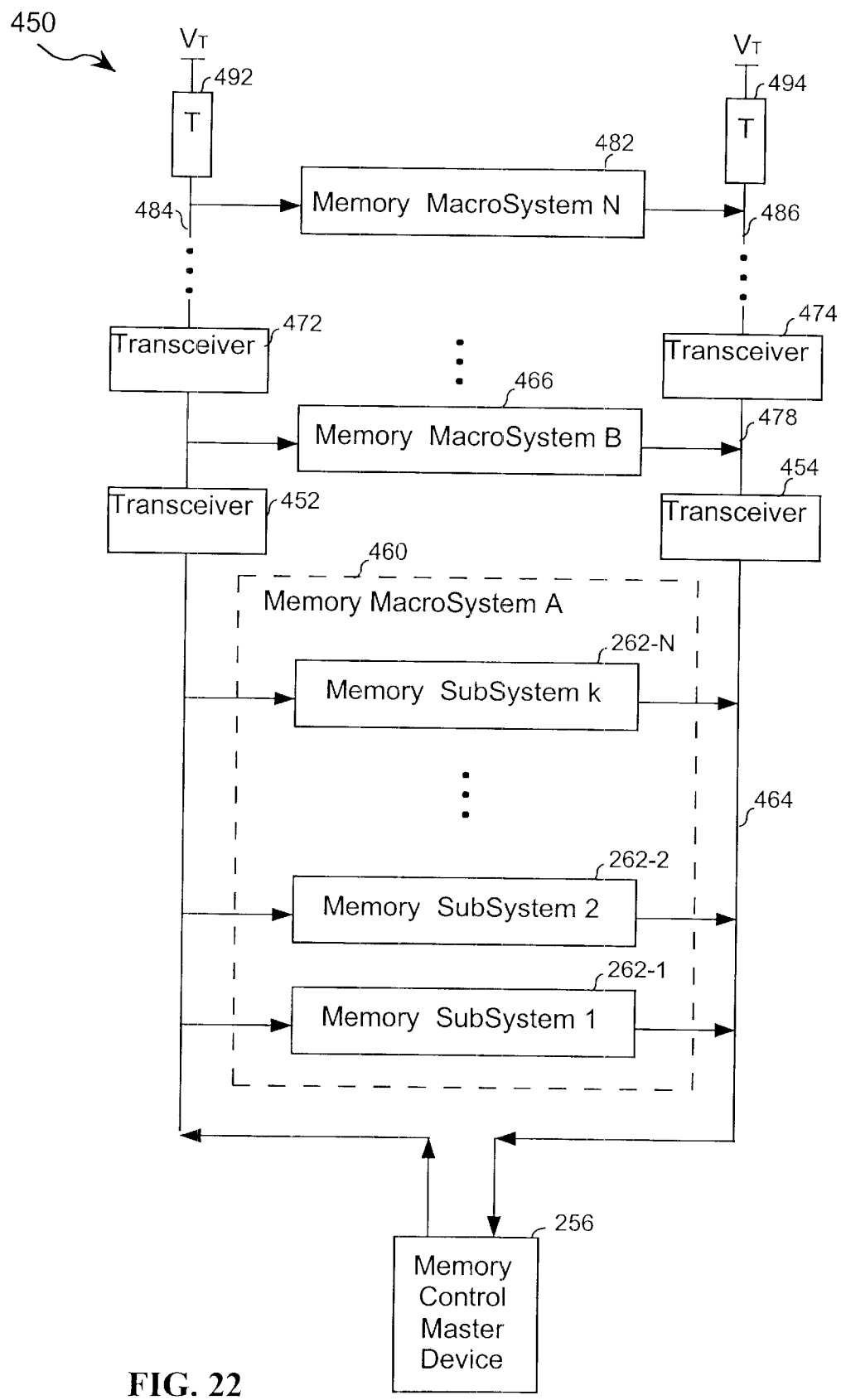
FIG. 22 is a block diagram of an expandable memory system that expands the length of a global bus.

In FIG. 22, a memory system 450 further increases memory capacity. Memory system 450 is similar to the memory system of FIG. 11 except that the terminators at the ends of the unidirectional bus of FIG. 11 have been replaced with transceiver ASICs 452 and 454. A set of memory subsystems 268 form a memory macrosystem 460 that connects to the unidirectional busses 462 and 464. Another memory macrosystem 466 connects to the other side of transceivers 452 and 454. In this system 450, all memory macrosystems are the same.

Additional transceivers 472 and 474 are connected to the global buses 476 and 478, respectively, to extend the respective global buses. A last memory macro system 482 connects to the extended global busses 484 and 486. At the end of the extended global busses 484 and 486, and beyond the last memory macrosystem 482, passive terminators 492 and 494 terminate the extended global busses 484 and 486, respectively.

Bidirectional Global Bus With Unidirectional Memory Subsystems

Figure 23:
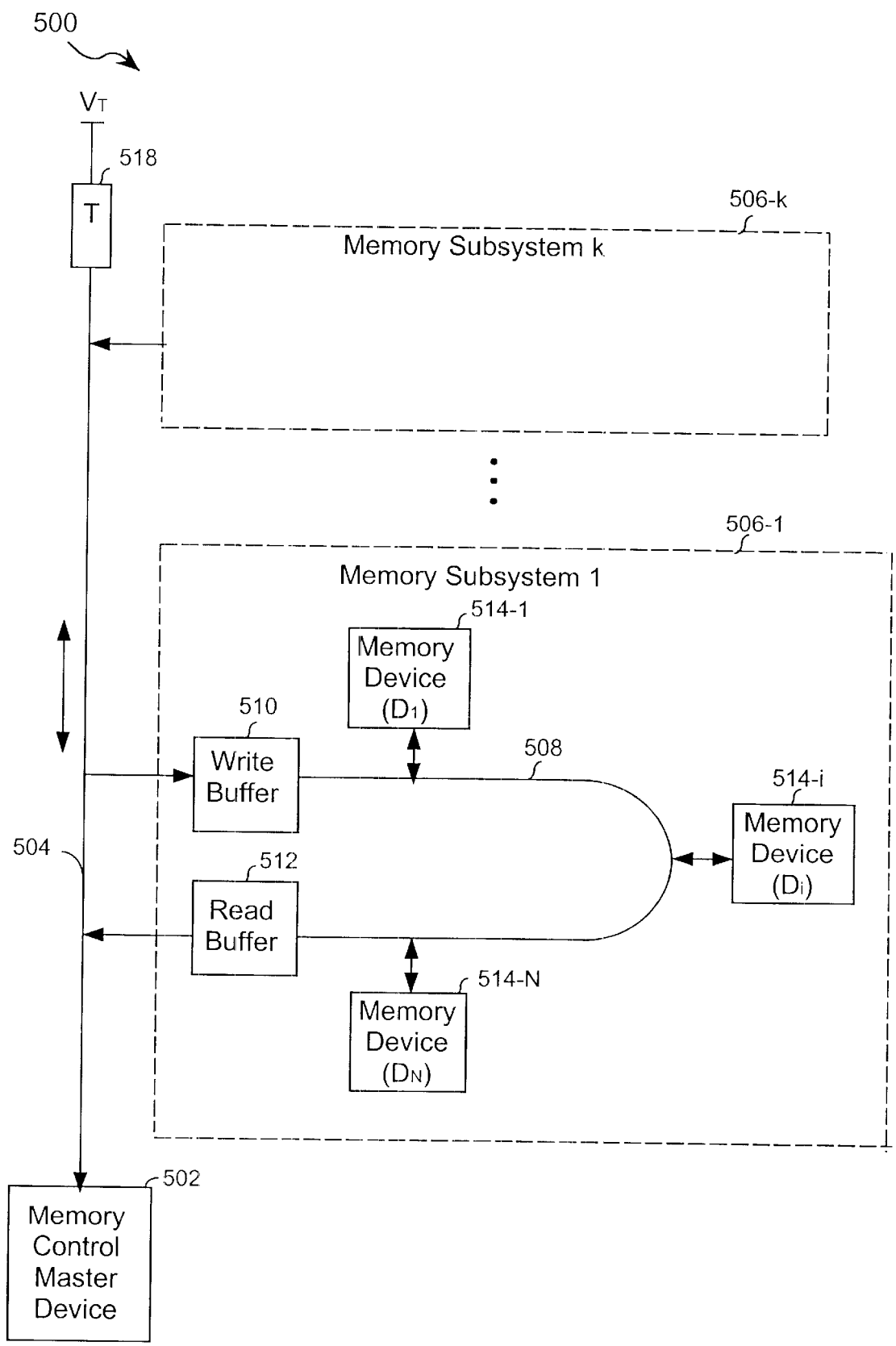
FIG. 23 is a block diagram of a memory system having a bidirectional global bus with unidirectional memory subsystems.

FIG. 23 is a block diagram of a memory system 500 having a master device 502 that is connected to a bidirectional global bus 504. Memory subsystems 506 connect to the bidirectional global bus 504; and each memory subsystem 506 has a unidirectional local bus 508 that connects to a separate write buffer 512 and read buffer 514. Memory devices 514 connect to the local bus 508. In other words, the memory subsystem 506 is the same as the memory subsystem 120 of FIG. 6 except that both the write buffer 510 and read buffer 512 are connected to the same bidirectional global bus 504. In alternate embodiments, the memory subsystems of FIGS. 7, 9 and 10 are used. A passive terminator 518 terminates a signal line of the global bus.

The memory system 500 of FIG. 23 has a less complex global topology and uses fewer global bus signal lines than the topologies of FIGS. 5 and 11. However, because the global bus is bidirectional, the utilization on the global bus is not as high as the utilization of the unidirectional global bus topologies.

Dual Unidirectional Global Bus With Bidirectional Memory Subsystems

Figure 24:
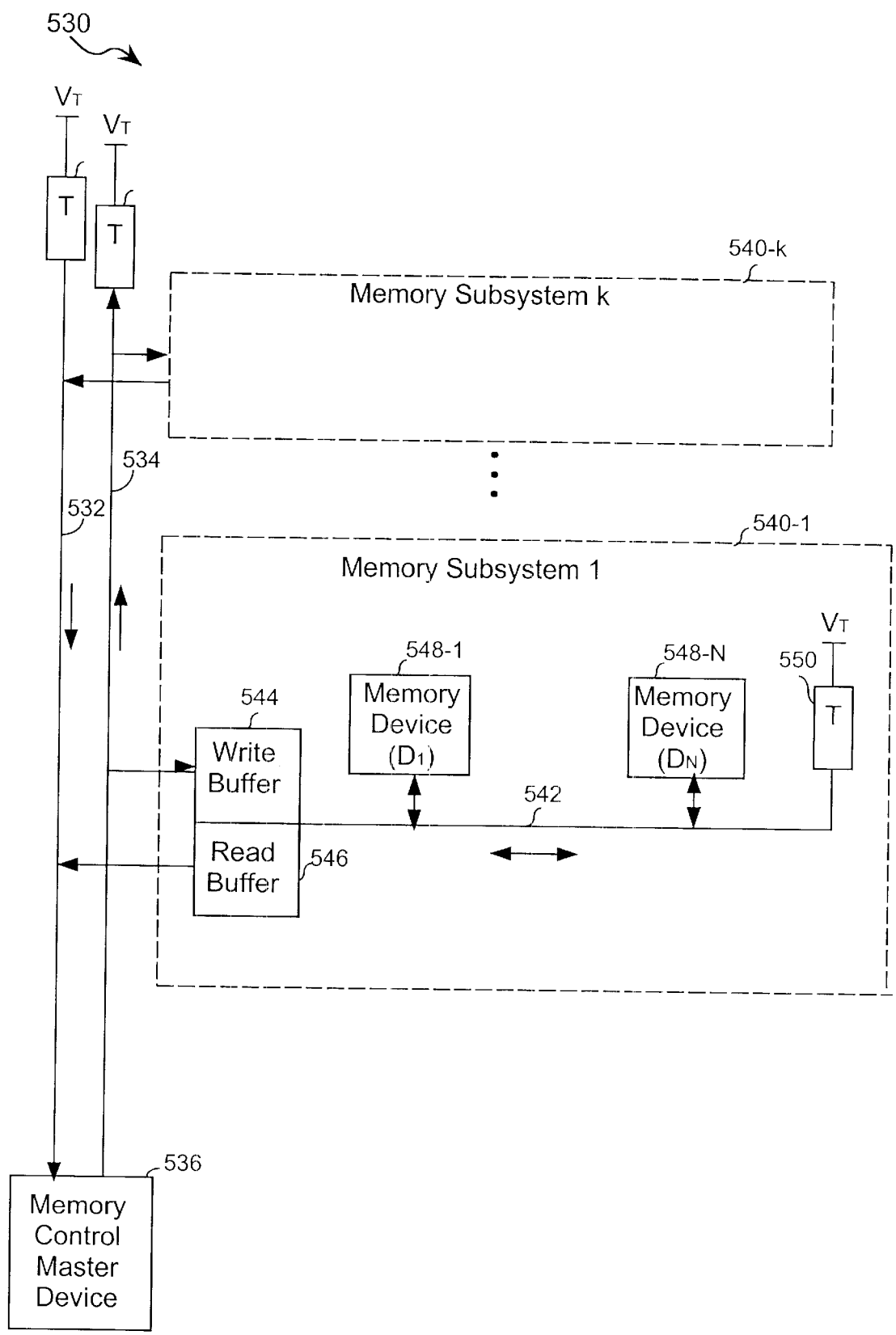
FIG. 24 is block diagram of a memory system having a dual unidirectional global bus with bidirectional memory subsystems.

FIG. 24 is a memory system 530 that has two unidirectional global buses 532 and 534 that transport data in opposite directions. The global busses 532 and 534 connect to a master device 536. In this embodiment, the master device 536 has two sets of pins to connect to each data bus. The memory subsystems 540 have a bidirectional local bus 542 which connects a combined write buffer 544 and read buffer 546 to the memory devices 548. The bidirectional local busses 542 are terminated by a passive terminator 550.

The memory system 530 of FIG. 24 has a higher utilization of the global bus than the memory system 500 of FIG. 23, and is better matched to the utilization of the local busses. However, the memory system 530 of FIG. 24 has more pins on the master device and global bus signal lines than the memory system 500 of FIG. 23.

Electronically-controlled Moving Terminator

Figure 25:
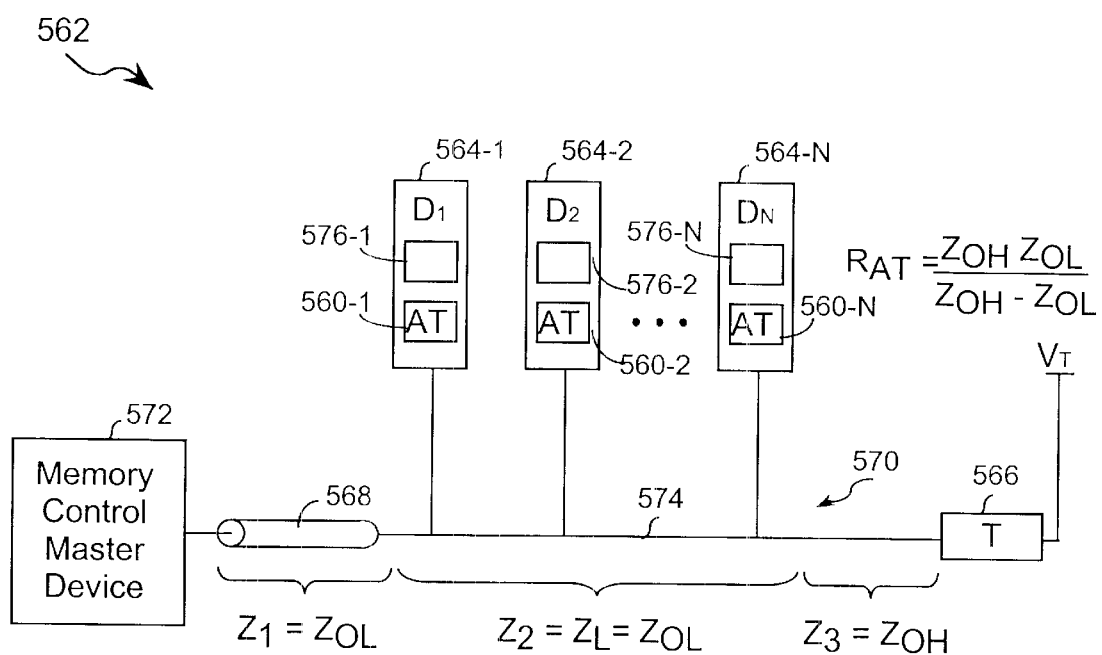
FIG. 25 is a block diagram of a memory system with an electronically controlled moving active terminator in which the memory devices are stacked vertically.

FIG. 25 illustrates the use of an active terminator (AT) 560 in a memory system 562 that stacks memory devices 564 vertically. In one embodiment, to vertically stacking, the memory devices 564, all the pins of the memory devices 564 are on one edge of the device and are coupled to a printed circuit board. Preferably, vertical stacking is implemented for the devices on the local bus. The vertical stacking further reduces the pitch, increases the passband and provides a reduced form factor which increases the packing density of the memory devices 564. The segment 568 of the bus 570 between the master device 572 and the first memory device 564-1 has a characteristic impedance of Z1 which is equal to $Z_{OL}$. The memory devices are attached to a portion of the bus 574 having a nominal characteristic impedance of Z3 which is set equal to $Z_{OH}$, where $Z_{OH}$ is greater than $Z_{OL}$.

The impedance $Z_{OH}$ is selected such that the input capacitances of the memory devices 564 cause a loaded segment to have an effective loaded impedance of Z2, which is equal to $Z_{OL}$ to match the impedance of the segment of the bus 570 between the master device 572 and the first memory device 564-1. However, there is an impedance discontinuity between Z2 and Z3 which may cause unwanted reflections on the bus signal line 570.

To solve the problems associated with the impedance discontinuity, all memory devices 564 are fabricated with active terminators 560 connected to their bus I/O pins as described above with respect to FIGS. 8A, 8B, 8C and 8D. Only the active terminators 560-N in the last memory device 564-N are activated. The terminator is described as electronically-moving because control signals deactivate all active terminators, except for the active terminator 560-N in the last memory device 564-N. As memory devices are added or removed, the active terminator follows the last memory device. That is, the active terminator is activated in the last memory device of the system. In one embodiment, separate control signals are used for initializing the memories and detecting which memory is last. In one embodiment, an SIO daisy-chain is used to initialize the memories. In another embodiment, the memories have a separate control bit 576 that is set and reset by the control bus to activate and deactivate the active terminator 562.

The impedance $R_{AT}$ of the active terminators (AT) is designed in accordance with relationship twenty-five as follows:

$$R_{AT} = \frac{(Z_{OL}Z_{OH})}{(Z_{OH} - Z_{OL})}. \tag{25}$$

The impedance $R_T$ of the passive terminator T is equal to $Z_{OH}$. As signals travel down the bus towards the passive terminator, the signals encounter a matched impedance equal to $R_{AT}$ in parallel with $Z_{OH}$ at the last memory device 564-N, which substantially reduces unwanted reflections, that would otherwise exist.

Therefore, an electronically-controlled moving terminator that does not need to be moved or set manually has been provided. Because the active terminator is implemented in all memory devices, no special terminating device needs to be placed at the end of the signal line.

Extensions

Although the embodiments of the invention described above were in the context of a random access memory system, those skilled in the art will recognize that the disclosed methods and structures are readily adaptable to broader applications. The invention is also applicable to many other types of computer memory systems.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A bus system for use with addressable slave devices comprising:
   a global bus comprising uni-directional signal lines, the global bus having a first end and a second end;
   a master device for transmitting data to and receiving data from the global bus;
   first and second global bus terminators coupled to the first and second ends of the global bus, respectively; and
   one or more subsystems connected in parallel to each other and to the master device via the global bus, each subsystem including:
   a local bus;
   one or more slave devices coupled to the local bus;
   a write buffer that receives incoming signals from the master device via the global bus and transmits the incoming signals to the one or more slave devices via the local bus; and
   a read buffer that receives outgoing signals from the one or more slave devices via the local bus and transmits the outgoing signals to the master device via the global bus.

2. The bus system of claim 1 wherein the first and second global bus terminators are passive terminators having substantially the same resistance.

3. The bus system of claim 1 wherein the first and second ends of the global bus are furthest opposing locations of the bus with respect to the master device.

4. The bus system of claim 1 wherein each local bus is unidirectional.

5. The bus system of claim 1 wherein the global bus comprises two independent data busses such that the master device transmits signals to the one or more subsystems on one data bus, and the master device receives signals from the one or more subsystems on another data bus.

6. The bus system of claim 5 wherein the master device transmits signals on the one data bus and receives signals on the other data bus simultaneously.

7. The bus system of claim 1 wherein the one or more subsystems further include:
   first and second subsystem terminators coupled to the local bus.

8. The bus system of claim 7 wherein the local bus has a write buffer end and a read buffer end, the first subsystem terminator is coupled to the local bus at a write buffer end of the local bus, and the second subsystem terminator is coupled to the local bus at a read buffer end of the local bus.

9. The bus system of claim 7 wherein the first and second subsystem terminators are passive terminators having substantially the same impedance.

10. The bus system of claim 7 wherein the local bus has a write buffer end, the first subsystem terminator is coupled to the local bus at the write buffer end, and the second subsystem terminator is coupled to the local bus in the read buffer.

11. The bus system of claim 7 wherein at least one of the first subsystem terminator and the second subsystem terminator is an active terminator.

12. The bus system of claim 11 wherein the active terminator includes a transistor.

13. The bus system of claim 12 wherein the transistor is a PMOS transistor.

14. The bus system of claim 11 wherein the at least one active terminator includes a transistor connected in series with a resistor.

15. The bus system of claim 14 wherein the transistor is a PMOS transistor.

16. The bus system of claim 11 wherein the at least one active terminator includes a set of transistors connected in parallel.

17. The bus system of claim 16 wherein each transistor of the set of transistors is a PMOS transistor.

18. The bus system of claim 16 wherein the set of transistors connects to a resistor.

19. The bus system of claim 7 wherein the first and second subsystem terminators are active terminators.

20. The bus system of claim 19 wherein the first subsystem terminator is in the write buffer, and the second subsystem terminator is in the read buffer.

21. The bus system of claim 19 wherein the first subsystem terminator is deactivated when the write buffer is transmitting data to the local bus, and the second subsystem terminator is deactivated when the read buffer is receiving data from the local bus.

22. The bus system of claim 19 wherein
   the first subsystem terminator is deactivated when the write buffer is transmitting data to the local bus, the first subsystem terminator being activated when the read buffer is receiving data from the local bus; and
   the second subsystem terminator is deactivated when the read buffer is receiving data from the local bus, the second subsystem terminator being activated when the write buffer is transmitting data to the local bus.

23. The bus system of claim 19 wherein the first subsystem terminator is activated when a signal traveling toward the write buffer reaches the write buffer, the second subsystem terminator is deactivated when a signal traveling toward the read buffer reaches the read buffer.

24. The bus system of claim 7 wherein the first subsystem terminator is a passive terminator located at a write buffer end of the local bus, and the second subsystem terminator is an active terminator located in the read buffer.

25. The bus system of claim 24 wherein the active terminator is deactivated when reading data.

26. The bus system of claim 11 wherein the first subsystem terminator is an active terminator located in the write buffer, and the second subsystem terminator is a passive terminator.

27. The bus system of claim 26 wherein that the active terminator is deactivated when the write buffer transmits data.

28. The bus system of claim 1 wherein data is transmitted on the local bus in packets, when one of the slave devices transmits a read packet, that read packet is transmitted towards the read buffer and towards the write buffer, and the write buffer transmits data after that read packet is received at the write buffer.

29. The bus system of claim 1 wherein data is transmitted on the local bus in packets and each packet is transmitted in a data slot, and the duration of the data slot is greater than or equal to a time for each packet to travel between adjacent slave devices.

30. The bus system of claim 1 wherein the master device transmits data on the signal lines of the global bus, further comprising:
   one or more global clock lines;
   a clock source that supplies one or more global clock signals on the global clock lines;
   wherein the master device transmits data synchronized to the one or more global clock signals, and at least one of the one or more subsystems receives the data and the one or more global clock signals.

31. The bus system of claim 1 wherein
the slave devices have a transmit clock input and a receive clock input for synchronizing the sending and receiving of data from the local bus,
further comprising:
a global clock line;
a clock source that supplies a global clock signal on the global clock line;
wherein the master device transmits data to be stored in one of the slave devices, the data being synchronized to the global clock signal,
wherein each write buffer derives a local clock signal from the global clock signal and supplies the local clock signal and the data to the slave devices, such that the data is synchronized to the local clock signal, wherein the local clock signal is supplied to a clock input of each slave device.

32. The bus system of claim 1 wherein the write buffer receives a global receive clock signal and provides a local receive clock signal based on the global receive clock signal, and the slave devices receive the local receive clock signal and at least a subset of the incoming signals in accordance with the local receive clock signal.

33. The bus system of claim 11 wherein the data includes a sequence of symbols, further comprising:
a global control bus transmitting control signals, coupled between the master device and each subsystem, the master device supplying at least one control signal that activates and deactivates at least one active terminator in sequence with the symbols.

34. The bus system of claim 1 wherein the global bus transports data at a first data rate, and each local bus transports data at a second data rate, the first data rate being greater than the second data rate.

35. The bus system of claim 1 wherein the global bus and each local bus transport data at the same data rate.

36. The bus system of claim 1 wherein the slave devices include memory devices.

37. A bus system comprising:
a global bus comprising uni-directional signal lines, the global bus having global bus sections each section including a first end and a second end;
a master device transmitting data to one global bus section and receiving data from another global bus section;
first and second global bus terminators coupled to the first and second ends of a last global bus section;
a plurality of macrosystems including a first and a last macrosystem, each macrosystem including:
one or more subsystems connected in parallel to each other and to the master device via the global bus, each subsystem including:
a local bus;
one or more slave devices coupled to the local bus;
a write buffer that receives incoming signals from the master device via the global bus and transmits the incoming signals to the one or more slave devices via the local bus; and
a read buffer that receives outgoing signals from the one or more slave devices via the local bus and transmits the outgoing signals to the master device via the global bus; and
a plurality of global bus transceivers connecting global bus sections, each pair of global bus sections being coupled to at least one macrosystem.

* * * * *

UNITED STATES PATENT AND TRADEMARK OFFICE
CERTIFICATE OF CORRECTION

PATENT NO. : 6,687,780 B1
DATED : February 3, 2004
INVENTOR(S) : Bruno W. Garlepp et al.

It is certified that error appears in the above-identified patent and that said Letters Patent is hereby corrected as shown below:

Column 35,
Line 6, after the word "device", delete the word "for".

Column 36,
Line 65, after the word "signals," delete the word "and".
Line 66, replace the word "receives" with -- receiving --.

Signed and Sealed this

Sixth Day of July, 2004

JON W. DUDAS
*Acting Director of the United States Patent and Trademark Office*